(12) United States Patent
Lee et al.

(10) Patent No.: US 10,728,069 B2
(45) Date of Patent: *Jul. 28, 2020

(54) PACKET MODE AUTO-DETECTION IN MULTI-MODE WIRELESS COMMUNICATION SYSTEM, SIGNAL FIELD TRANSMISSION FOR THE PACKET MODE AUTO-DETECTION, AND GAIN CONTROL BASED ON THE PACKET MODE

(71) Applicant: Electronics and Telecommunications Research Institute, Daejeon (KR)

(72) Inventors: IL-Gu Lee, Seoul (KR); Eun-Young Choi, Daejeon (KR); Sok-Kyu Lee, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,910

(22) Filed: Jul. 31, 2018

(65) Prior Publication Data

US 2018/0375701 A1 Dec. 27, 2018

Related U.S. Application Data

(63) Continuation of application No. 15/287,748, filed on Oct. 7, 2016, now Pat. No. 10,057,095, which is a
(Continued)

(30) Foreign Application Priority Data

Oct. 26, 2009 (KR) .................. 10-2009-0101925
Oct. 26, 2009 (KR) .................. 10-2009-0101956
(Continued)

(51) Int. Cl.
*H04L 27/26* (2006.01)
*H04L 27/00* (2006.01)
(Continued)

(52) U.S. Cl.
CPC ........ *H04L 27/2601* (2013.01); *H04L 5/0048* (2013.01); *H04L 27/0012* (2013.01);
(Continued)

(58) Field of Classification Search
CPC . H04L 27/22; H04L 27/2273; H04L 27/2601; H04L 5/0048; H04L 69/22; H04L 27/0008; H04L 27/2602; H04B 1/38
(Continued)

(56) References Cited

U.S. PATENT DOCUMENTS 6,125,124 A 9/2000 Junell et al.
6,400,750 B1 6/2002 Lee et al.
(Continued)

FOREIGN PATENT DOCUMENTS

KR 10-2007-0025531 A 3/2007
KR 10-2008-0045039 A 5/2008

OTHER PUBLICATIONS

Leonardo Lanante, "IEEE802.11ac Preamble with Legacy 802.11a/n Backward Compatibility", doc.: IEEE802.11-yy/0847r0, Jul. 14, 2009.
(Continued)

*Primary Examiner* — Emmanuel Bayard

(57) ABSTRACT

A method for automatically detecting a packet mode in a wireless communication system supporting a multiple transmission mode includes: acquiring at least one of data rate information, packet length information and channel bandwidth information from a transmitted frame; and determining the packet mode on the basis of the phase rotation check result of a symbol transmitted after a signal field signal and at least one of the data rate information, the packet length information and the channel bandwidth information acquired from the transmitted frame.

18 Claims, 20 Drawing Sheets

Related U.S. Application Data continuation of application No. 14/842,623, filed on Sep. 1, 2015, now Pat. No. 9,503,304, which is a continuation of application No. 14/676,551, filed on Apr. 1, 2015, now Pat. No. 9,154,359, which is a continuation of application No. 14/044,803, filed on Oct. 2, 2013, now Pat. No. 9,001,637, which is a continuation of application No. 12/912,666, filed on Oct. 26, 2010, now Pat. No. 8,582,418.

(30) Foreign Application Priority Data

| Jan. 22, 2010 | (KR) | ........................ | 10-2010-0006218 |
| Feb. 12, 2010 | (KR) | ........................ | 10-2010-0013642 |

(51) Int. Cl.

| H04L 27/22 | (2006.01) |
| H04W 72/04 | (2009.01) |
| H04L 5/00 | (2006.01) |
| H04L 27/227 | (2006.01) |
| H04L 27/34 | (2006.01) |
| H04W 84/12 | (2009.01) |

(52) U.S. Cl.
CPC .......... *H04L 27/22* (2013.01); *H04L 27/2273* (2013.01); *H04L 27/3444* (2013.01); *H04W 72/042* (2013.01); *H04W 84/12* (2013.01)

(58) Field of Classification Search
USPC .................................................. 375/260, 340
See application file for complete search history.

(56) References Cited

U.S. PATENT DOCUMENTS

| 6,700,940 | B1 | 3/2004 | Katoh et al. |
| 7,336,683 | B1 | 2/2008 | Edison et al. |
| 7,508,876 | B2 | 3/2009 | Tzannes |
| 7,545,827 | B2 | 6/2009 | Tao et al. |
| 7,711,061 | B2 | 5/2010 | Trachewsky |
| 7,957,474 | B2 | 6/2011 | Waters et al. |
| 7,974,591 | B2 | 7/2011 | Trachewsky et al. |
| 7,995,672 | B2 | 8/2011 | Pare, Jr. et al. |
| 8,059,701 | B2 | 11/2011 | Tung |
| 8,098,719 | B2 | 1/2012 | Tzannes |
| 8,111,608 | B2 | 2/2012 | Takahashi |
| 8,144,683 | B1 | 3/2012 | Sun et al. |
| 8,204,168 | B2 | 6/2012 | Yajima et al. |
| 8,213,541 | B2 | 7/2012 | Nakao et al. |
| 8,331,497 | B2 | 12/2012 | Alagha et al. |
| 8,359,530 | B2 | 1/2013 | Sawai |
| 8,532,213 | B2 | 9/2013 | Trachewsky |
| 8,582,418 | B2 | 11/2013 | Lee et al. |
| 8,599,804 | B2 | 12/2013 | Erceg |
| 8,670,494 | B2 | 3/2014 | Ko et al. |
| 8,675,597 | B2 | 3/2014 | Lee et al. |
| 8,681,757 | B2 | 3/2014 | Lee |
| 8,717,865 | B2 | 5/2014 | Yang et al. |
| 8,718,191 | B2 | 5/2014 | Lee et al. |
| 8,743,862 | B2 | 6/2014 | Powell et al. |
| 8,891,435 | B2 | 11/2014 | Zhang et al. |
| 8,976,674 | B2 | 3/2015 | Pare, Jr. et al. |
| 9,001,637 | B2 | 4/2015 | Lee et al. |
| 9,047,865 | B2 | 6/2015 | Aguilar et al. |
| 9,107,099 | B2 | 8/2015 | Erceg |
| 9,655,002 | B2 | 5/2017 | Zhang |
| 10,057,095 | B2 * | 8/2018 | Lee .................... H04L 27/0012 |
| 2004/0258142 | A1 | 12/2004 | Tzannes |
| 2006/0140303 | A1 | 6/2006 | Egashira et al. |
| 2007/0047666 | A1 | 3/2007 | Trachewsky |
| 2007/0133704 | A1 | 6/2007 | Tzannes |
| 2007/0253499 | A1 | 11/2007 | Waters et al. |
| 2008/0212696 | A1 | 8/2008 | Takahashi |
| 2009/0072954 | A1 | 3/2009 | Kim et al. |
| 2010/0046656 | A1 | 2/2010 | van Nee et al. |
| 2010/0111229 | A1 | 5/2010 | Kasher et al. |
| 2010/0225752 | A1 | 9/2010 | Bench et al. |
| 2010/0260159 | A1 | 10/2010 | Zhang et al. |
| 2010/0315953 | A1 | 12/2010 | Pare, Jr. et al. |
| 2011/0038441 | A1 | 2/2011 | Shi |
| 2011/0110348 | A1 | 5/2011 | Lee et al. |
| 2011/0149927 | A1 | 6/2011 | Stacey et al. |
| 2011/0188482 | A1 | 8/2011 | Vermani et al. |
| 2011/0206156 | A1 | 8/2011 | Lee et al. |
| 2011/0286378 | A1 | 11/2011 | Kim et al. |
| 2011/0317775 | A1 | 12/2011 | Gardner et al. |
| 2012/0076201 | A1 | 3/2012 | Kimmich et al. |
| 2012/0093025 | A1 | 4/2012 | Pare, Jr. et al. |
| 2012/0263158 | A1 | 10/2012 | Lee et al. |
| 2013/0266027 | A1 | 10/2013 | Takada et al. |
| 2014/0029685 | A1 * | 1/2014 | van Nee ............... C08F 214/18 375/267 |
| 2014/0140312 | A1 | 5/2014 | Lee et al. |
| 2016/0050093 | A1 | 2/2016 | Choi |

OTHER PUBLICATIONS

Notice of Allowance dated Jul. 12, 2013 in U.S. Appl. No. 12/912,666.
Non-final Office Action dated Feb. 8, 2013 in U.S. Appl. No. 12/912,666.
Election/Restriction dated Nov. 2, 2012 in U.S. Appl. No. 12/912,666.
Notice of Allowance dated Dec. 5, 2014 in U.S. Appl. No. 14/044,803.
Non-final Office Action dated Aug. 19, 2014 in U.S. Appl. No. 14/044,803.
Notice of Allowance dated May 22, 2015 in U.S. Appl. No. 14/676,551.
Notice of Allowance dated Aug. 25, 2016 in U.S. Appl. No. 14/842,623.
Notice of Allowance dated Jul. 6, 2016 in U.S. Appl. No. 14/842,623.
Non-final Office Action dated Nov. 19, 2015 in U.S. Appl. No. 14/842,623.
Non-final Office Action dated Dec. 16, 2016 in U.S. Appl. No. 15/287,748.
Final Office Action dated Dec. 26, 2017 in U.S. Appl. No. 15/287,748.
Notice of Allowance dated Apr. 18, 2018 in U.S. Appl. No. 15/287,748.
IEEE Std. 802.11-2007 Standard, by IEEE Computer Society ("IEEE 802.11-2007 Standard").
IEEE P802.11n/D11.0, Jun. 2009 Draft Standard, by IEEE802.11 Working Group of the 802 Committee ("IEEE 802.11n-2009").
"IEEE802.11ac Preamble with Legacy 802.11a/n Backward Compatibility," TGac doc. IEEE 802.11-09/0847r0, by Lamante et al. ("IEEE 802.11-09/0847r0").
IEEE Std. 802.11n-2009 Standard, by IEEE Computer Society ("IEEE 802.11n Final Standard").
"802.11ac Preamble," TGac doc. IEEE 802.11-10/0070r0, by Zhang et al. ("IEEE 802.11-10/0070r0").
"Specification Framework for TGac," TGac doc. IEEE 802.11-09/0992r15 by Stacey et al. ("IEEE 802.11-09/0992r15").
"Strawmodel 802.11ac Specification Framework," TGac doc. IEEE 802.11-09/0633r0, by van Nee et al. ("IEEE 802.11-09/0633r0") (in lieu of "IEEE 802.11-09/0633r1").
"VHT-SIG-A and VHT-SIG-B Field Structure," TGac doc. IEEE 802.11-10/1052r0, by van Nee et al. ("IEEE 802.11-10/1052r0").
"802.11ac Preamble", TGac doc. IEEE 802.11-10/876r1, by Sampath et al. (IEEE 802.11-10/876r1).
Defendant's Preliminary Invalidity Contentions submitted on Jul. 22, 2019 for Case No. 2:18-cv-00526 (E.D. Texas).
Intervenor Ericsson Inc.'s Preliminary Invalidity Contentions submitted on Jul. 22, 2019 for Case No. 2:18-cv-00526 (E.D. Texas).
Exhibits S-1-S-8 for Defendant's Preliminary Invalidity Contentions submitted on Jul. 22, 2019 for Case No. 2:18-cv-00526 (E.D. Texas).

(56) References Cited

OTHER PUBLICATIONS

Appendix S for Defendant's Preliminary Invalidity Contentions submitted on Jul. 22, 2019 for Case No. 2:18-cv-00526 (E.D. Texas).

* cited by examiner

PACKET MODE AUTO-DETECTION IN MULTI-MODE WIRELESS COMMUNICATION SYSTEM, SIGNAL FIELD TRANSMISSION FOR THE PACKET MODE AUTO-DETECTION, AND GAIN CONTROL BASED ON THE PACKET MODE

CROSS REFERENCE TO RELATED APPLICATIONS

The present application is a continuation of U.S. patent application Ser. No. 15/287,748, filed on Oct. 7, 2016 (now pending), which is a continuation of U.S. patent application Ser. No. 14/842,623, filed on Sep. 1, 2015 (now U.S. Pat. No. 9,503,304 issued on Nov. 22, 2016), which is a continuation of U.S. patent application Ser. No. 14/676,551, filed on Apr. 1, 2015 (now U.S. Pat. No. 9,154,359 issued on Oct. 6, 2015), which is a continuation of U.S. patent application Ser. No. 14/044,803, filed on Oct. 2, 2013 (now U.S. Pat. No. 9,001,637 issued on Apr. 7, 2015), which is a continuation of U.S. patent application Ser. No. 12/912,666 filed on Oct. 26, 2010 (now U.S. Pat. No. 8,582,418 issued on Nov. 12, 2013), which claims priority of Korean Patent Application No. 10-2009-0101925, filed on Oct. 26, 2009; Korean Patent Application No. 10-2009-0101956, filed on Oct. 26, 2009; Korean Patent Application No. 10-2010-0006218, filed on Jan. 22, 2010; and Korean Patent Application No. 10-2010-0013642, filed on Feb. 12, 2010, the entire contents of which are incorporated herein by reference.

BACKGROUND OF THE INVENTION

1. Field of the Invention

Exemplary embodiments of the present invention relate to packet mode auto-detection in a multi-mode wireless communication system, signal field transmission for the packet mode auto-detection, and gain control based on the packet mode; and, more particularly, to a method for automatically detecting a packet mode in a multi-mode wireless communication system (e.g., a Wireless Local Area Network (WLAN) communication system supporting various modes) by using a data rate value and a packet length setting value, a method for transmitting a signal field for auto-detection of a packet mode by phase rotation of a data tone and/or a pilot tone at the signal field transmission, and a method for performing an automatic gain control according to the detected packet mode.

2. Description of Related Art

In general, a wireless communication device based on the IEEE 802.11n standards uses up to four multiple antennas and a 40 MHz bandwidth and reduces an overhead, thereby making it possible to transmit data at a data rate 10 times higher than a 54 Mbps data rate of a wireless communication device based on the conventional IEEE 802.11a/g standards. Hereinafter, a wireless transmission mode based on the IEEE 802.11a/g standards will be called a legacy mode, and a wireless transmission mode based on the IEEE 802.11n standards will be called a High Throughput (HT) mode.

An HT signal field HT-SIG is added in an IEEE 802.11n packet in order to maintain the compatibility with a legacy mode such as IEEE 802.11a/g while supporting an HT mode of IEEE 802.11n. The addition of the HT signal field in the IEEE 802.11n packet is to facilitate the discrimination from a legacy packet and to process a received signal in conformity with the HT packet frame format.

In general, a legacy transmission frame includes an Orthogonal Frequency Division Multiplexing (OFDM) packet preamble, a signal field, and an OFDM data field. For compatibility with the conventional IEEE 802.11a/g standards, an IEEE 802.11n-based transmission frame includes: a common part receivable by both a legacy terminal and a HT terminal; and a HT-dedicated part receivable only by an HT terminal. The common part includes an OFDM packet preamble (L-STF, L-LTF) and an L-SIG field that is a signal field for a legacy terminal. The HT-dedicated part includes an HT-SIG1/HT-SIG2 field (i.e., a signal field for an HT terminal), an HT-SIF/HT-LTF field (i.e., a preamble field for an HT terminal), and an OFDM data field.

In such an HT transmission frame structure, a discrimination between a legacy mode and an HT mode is made between L-SIG and HT-SIG. For a discrimination between a legacy mode and an HT mode, a conventional method transmits an HT signal field by modulating it by a Quadrature Binary Phase Shift Keying (Q-BPSK) scheme that rotates the phase of a data tone of the HT signal field by 90 degrees, as illustrated in FIG. 1.

That is, as illustrated in FIG. 1, an HT signal field HT-SIG is transmitted by 90 degree phase modulating a data tone of the HT signal field HT-SIG in comparison with a legacy signal field L-SIG. Thus, a receiving (RX) terminal can determine whether an HT signal field HT-SIG or a data field for a legacy terminal is received after a legacy signal field.

However, such a conventional packet mode detection method has a great difficulty in discriminating a Q-BPSK modulation signal of an HT signal field and a 64-QAM modulation signal for data. In order to solve such a problem, the conventional method discriminates between a 64-QAM signal and a Q-BPSK signal by comparing the accumulation values of the mapped signal values by using a detection threshold value as illustrated in FIG. 1. However, such a conventional packet mode detection method has the following problems.

First, the conventional method is low in terms of the reliability of packet mode detection. The method of discriminating between a 64-QAM signal and a Q-BPK signal by a detection threshold value as illustrated in FIG. 1 is low in terms of a signal-to-noise ratio (SNR) and has a high probability that a mode detection error may occur due to a noise in a poor environment with a severe channel change. A 64-QAM signal is the maximum modulation mode in the conventional method, but the problem becomes more serious if the higher modulation scheme (e.g., a 256-QAM modulation scheme) is used for a very high throughput mode. Therefore, a simple comparison of BPSK and Q-BPSK can be made according to the 6 Mbps data rate setting of a legacy signal field, but it is difficult to detect an error in the legacy signal field through a one-bit parity check if a channel environment is poor.

Secondly, the conventional method is low in terms of extendibility. If the conventional method is used to discriminate between an HT mode and a Very High Throughput (VHT) mode (the mode following the HT mode) in the HT-SIG, an automatic packet mode detection becomes impossible because the I energy and the Q energy become equal in the case of a terminal using both of the two HT-SIG symbols among the terminals supporting the IEEE 802.11n standards. Accordingly, the total network throughput decreases and the power consumption efficiency decreases.

The above problems of the conventional method may become more serious when detecting packets based on the Very High Throughput (VHT) wireless communication standards (e.g., IEEE 802.11ac) following the conventional wireless LAN standards. Hereinafter, the IEEE 802.11ac-based wireless transmission mode will be referred to as a VHT mode.

SUMMARY OF THE INVENTION

An embodiment of the present invention is directed to a method for automatically detecting a packet mode in a wireless communication system supporting multi-mode packets, which can perform an automatic packet mode detection with a high reliability while providing a compatibility with the conventional method.

Another embodiment of the present invention is directed to a method for automatically detecting a packet mode in a multi-mode wireless communication system with a high reliability by using a data rate value and a packet length setting value.

Another embodiment of the present invention is directed to a method for transmitting a signal field in a multi-mode wireless communication system by using a modulation scheme based on the phase rotation of a data tone and/or a pilot tone, which can implement an automatic packet mode detection with a high reliability while providing a compatibility with the conventional method.

Another embodiment of the present invention is directed to a method for automatically detect a packet mode in a multi-mode wireless communication system by using a different periodicity or a phase difference of a preamble.

Another embodiment of the present invention is directed to a method for automatically detecting a packet mode in a multi-mode wireless communication system by using a reserved bit of a signal field L-SIG for a legacy terminal and a reserved bit of a signal field HT-SIG for an HT terminal, which can perform an automatic packet mode detection with a high reliability while providing a compatibility with the conventional method.

Another embodiment of the present invention is directed to a method for performing an automatic gain control in a multi-mode wireless communication system according to the packet mode detected through a packet mode detection process.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for automatically detecting a packet mode in a wireless communication system supporting a multiple transmission mode includes: acquiring at least one of data rate information, packet length information and channel bandwidth information from a transmitted frame; and determining the packet mode on the basis of the phase rotation check result of a symbol transmitted after a signal field signal and at least one of the data rate information, the packet length information and the channel bandwidth information acquired from the transmitted frame.

Herein, the data rate information may include at least one of the data rate information HT_RATE for a High Throughput (HT) mode and the data rate information L_RATE for a legacy mode included in the signal field of the transmitted frame.

Also, the packet length information may include at least one of the packet length information HT_LENGTH for a High Throughput (HT) mode and the packet length information L_LENGTH for a legacy mode included in the signal field of the transmitted frame.

Also, the signal field may include at least one of the signal field L-SIG for a legacy mode and the signal field HT-SIG for a High Throughput (HT) mode, and the packet mode may be determined by checking whether a symbol following the L-SIG signal or the HT-SIG signal is a phase rotation modulation mode.

In accordance with another embodiment of the present invention, a method for automatically detecting a packet mode in a wireless communication system supporting a multiple transmission mode includes: acquiring at least one of data rate information, packet length information and channel bandwidth information from a transmitted frame; and determining the packet mode on the basis of the phase rotation type information of a symbol and at least one of the data rate information, the packet length information and the channel bandwidth information acquired from the transmitted frame.

In the packet mode determination, the phase rotation state information of a symbol following an L-SIG signal that is the signal field for a legacy mode may be additionally used, and the packet mode may be determined on the basis of the phase rotation information, the phase rotation state information of the symbol following the L-SIG signal, and at least one of the data rate information, the packet length information and the channel bandwidth information.

Herein, the data rate information may include at least one of the data rate information HT_RATE for a High Throughput (HT) mode and the data rate information L_RATE for a legacy mode included in the signal field of the transmitted frame.

Also, the packet length information may include at least one of the packet length information HT_LENGTH for a High Throughput (HT) mode and the packet length information L_LENGTH for a legacy mode included in the signal field of the transmitted frame.

In accordance with another embodiment of the present invention, a method for transmitting a signal field VHT-SIG for a Very High Throughput (VHT) terminal to automatically detect a packet mode in a wireless communication system that transmits a packet frame including a signal field L-SIG for a legacy terminal and a signal field VHT-SIG for a Very High Throughput (VHT) terminal includes: modulating a symbol of the VHT-SIG field prior to transmission, while rotating the phase of a pilot tone and/or a data tone by a predetermined degree in comparison with the L-SIG field.

Herein, the data tone may be rotated by one of 0 degree, 45 degrees, 90 degrees and 135 degrees. Also, the pilot tone may be rotated by one of 0 degree, 90 degrees, 180 degrees and 270 degrees.

In accordance with another embodiment of the present invention, a method for automatically detecting a packet mode in a wireless communication system supporting a multiple mode including a legacy mode for a legacy terminal, a High Throughput (HT) mode for a high throughput terminal, and a Very High Throughput (VHT) mode for a very high throughput terminal includes: receiving a preamble signal for the VHT mode modulated to have a phase difference in comparison with a preamble signal for the HT mode or a preamble signal for the legacy mode; and determining the packet to be the VHT mode packet, if the received preamble signal has a phase difference in comparison with the preamble signal for the HT mode or the preamble signal for the legacy mode.

In accordance with another embodiment of the present invention, a method for automatically detecting a packet mode in a wireless communication system supporting a multiple mode including a legacy mode for a legacy terminal, a High Throughput (HT) mode for a high throughput terminal, and a Very High Throughput (VHT) mode for a very high throughput terminal includes: receiving a preamble signal for the VHT mode modulated to have a periodicity difference in comparison with a preamble signal for the HT mode or a preamble signal for the legacy mode; and determining the packet to be the VHT mode packet, if the received preamble signal has a periodicity difference in comparison with the preamble signal for the HT mode or the preamble signal for the legacy mode.

In accordance with another embodiment of the present invention, a method for automatically detecting a packet mode in a wireless communication system supporting a multiple mode including a legacy mode for a legacy terminal, a High Throughput (HT) mode for a high throughput terminal, and a Very High Throughput (VHT) mode for a very high throughput terminal includes: setting the value of a reserved bit for a signal field of the legacy mode and the value of a reserved bit for a signal field of the HT mode for definition of the legacy mode, the HT mode or the VHT mode; and determining the packet mode by using the reserved bit value for the signal field of the legacy mode and the reserved bit value for the signal field of the HT mode.

In accordance with another embodiment of the present invention, a method for transmitting signal information for a Very High Throughput (VHT) mode in a wireless communication system supporting a multiple mode including a Very High Throughput (VHT) mode for a very high throughput terminal and at least one of a legacy mode for a legacy terminal and a High Throughput (HT) mode for a high throughput terminal includes: disposing a VHT signal field for the VHT mode after a legacy signal field for the legacy mode or an HT signal field for the HT mode and constructing a frame in which a portion of signal information for the VHT mode is recorded in a portion of the legacy signal field or a portion of the HT signal field; and transmitting the constructed frame.

In accordance with another embodiment of the present invention, a method for automatic gain control in a wireless communication system supporting a multiple mode including a Very High Throughput (VHT) mode for a very high throughput terminal and at least one of a legacy mode for a legacy terminal and a High Throughput (HT) mode for a high throughput terminal includes: calculating a gain value for automatic gain control; detecting a packet mode of a received packet; determining whether to perform a gain control by the calculated gain value or by using a short preamble, according to the packet mode detection result; and performing an automatic gain control on the basis of the determination result.

DESCRIPTION OF SPECIFIC EMBODIMENTS

Figure 1:
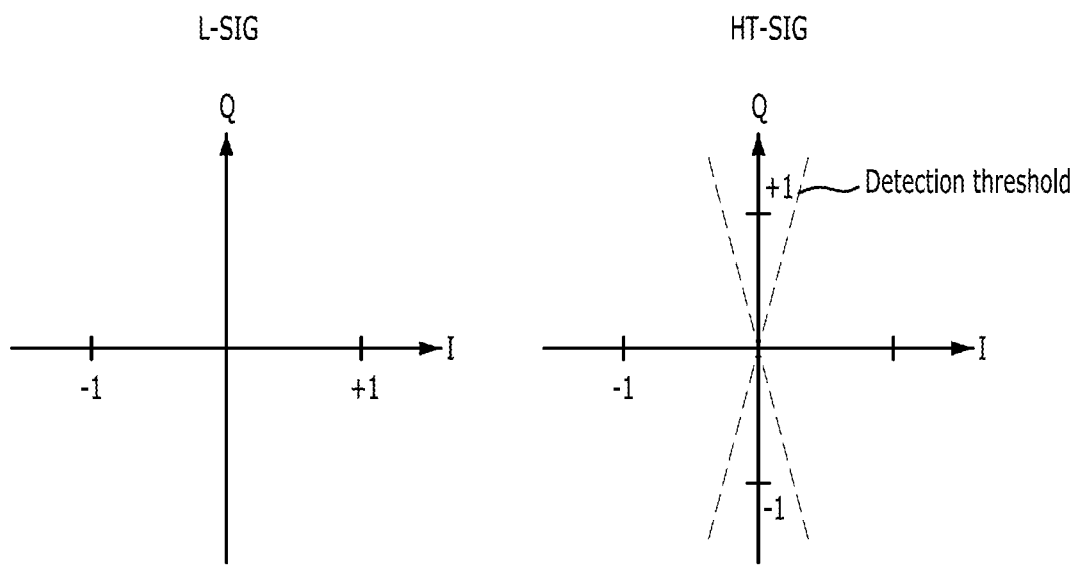
FIG. 1 is a diagram illustrating a conventional packet mode detection method.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The foregoing objects and advantages of the present invention will be described below in detail with reference to the accompanying drawings so that the technical concept of the present invention can be easily realized by those skilled in the art to which the present invention pertains. In the following description, detailed descriptions of well-known functions or configurations will be omitted in order not to unnecessarily obscure the subject matters of the present invention. Hereinafter, exemplary embodiments of the present invention will be described in detail with reference to the accompanying drawings.

The present invention provides a method for automatically detecting a packet mode in a wireless communication system supporting a multiple mode. The following description is made in the context of a wireless LAN, to which the present invention is not limited. Thus, those skilled in the art will readily understand that the present invention may also be applicable to any other wireless communication system that uses a multi-mode packet. The terms 'legacy', 'High Throughput (HT)', and 'Very High Throughput (VHT)' used herein to describe the present invention are not intended to designate specific modes, but are merely exemplary terms intended to represent packets of different modes in a wireless LAN for a better understanding of the present invention. Thus, those skilled in the art will readily understand that these terms may be replaced by other terms.

In general, a legacy mode signal field L-SIG has a Rate value L_RATE as a data rate value and has a Length value L_LENGTH as a packet length value. Also, an HT mode signal field HT-SIG has an MCS (Modulation and Coding Scheme, HT_RATE) value as a data rate value and has an HT_LENGTH value as a packet length value.

What is also provided is a technology for preventing a channel access of legacy terminals at HT mode packet transmission while an HT mode packet occupies a channel. This is called an L-SIG TXOP protection technology using the L_LENGTH and L_RATE of L-SIG. A packet length part and a data rate of an L-SIG field are set for channel occupation time setting for each of RTS, CTS and DATA packets.

In order to maintaining the compatibility with the conventional IEEE 802.11a/g wireless LAN and prevent a signal collision due to a conventional wireless LAN device, the IEEE 802.11n wireless LAN technology sets a data rate to 6 Mbps and sets a packet length in conformity with the channel occupation period of a transmission (TX) packet. That is, L_RATE and L_LENGTH values are set as "L_RATE=6 Mbps", "L_LENGTH Value of L-SIG=L_RATE×L_SIG Duration".

Herein, the channel occupation time of a TX packet is determined according to the data rate information and the packet length information of VHT-SIG or HT-SIG. That is, the channel occupation time of a TX packet of an HT mode packet is "HT_LENGTH/HT_RATE", and the channel occupation time of a TX packet of a VHT mode packet is "VHT_LENGTH/VHT_RATE".

A Network Allocation Vector (NAV) value is determined according to the channel occupation time of the TX packet, the known preamble signal and the signal field transmission time. That is, the NAV value is determined to be "aPreambleLength+aPLCPHeaderLength+L-SIG Duration-TX-TIME". Herein, aPreambleLength has a "L-STF+L-LTF" value as a legacy preamble transmission time, and aPLCPHeaderLength means a time necessary for L-SIG transmission. Also, L-SIG Duration has a "L_LENGTH/L_RATE" value as the channel occupation time of a TX packet, and TXTIME means a time necessary for packet transmission. HT-SIG Duration or VHT-SIG Duration may also be calculated in the same way as described above. In general, terminals failing to acquire the channel occupation right sets the NAV value to the sum of an L-SIG duration value and a preamble and signal field transmission time value.

In order to improve the throughput of a VHT mode and maintain the compatibility, the present invention provides a method for transmitting a VHT mode packet by setting HT_RATE to MCS0. On the basis of the above characteristics, the present invention performs an automatic packet mode detection process in the following manner.

1) A legacy mode or HT mode or VHT mode packet if L_RATE is set to 6 Mbps.
2) A legacy mode packet if L_RATE is not 6 Mbps.
3) An HT mode or VHT mode packet if L_LENGTH is greater than a threshold value 1.
4) A legacy mode packet if L_LENGTH is smaller than a threshold value 1.
5) An HT mode packet or a VHT mode packet if HT_RATE is set to MCS0.
6) An HT mode packet if HT_RATE is not MCS0.
7) A VHT mode packet if HT_LENGTH is greater than a threshold value 2.
8) An HT mode packet if HT_LENGTH is smaller than a threshold value 2.

Figure 2:
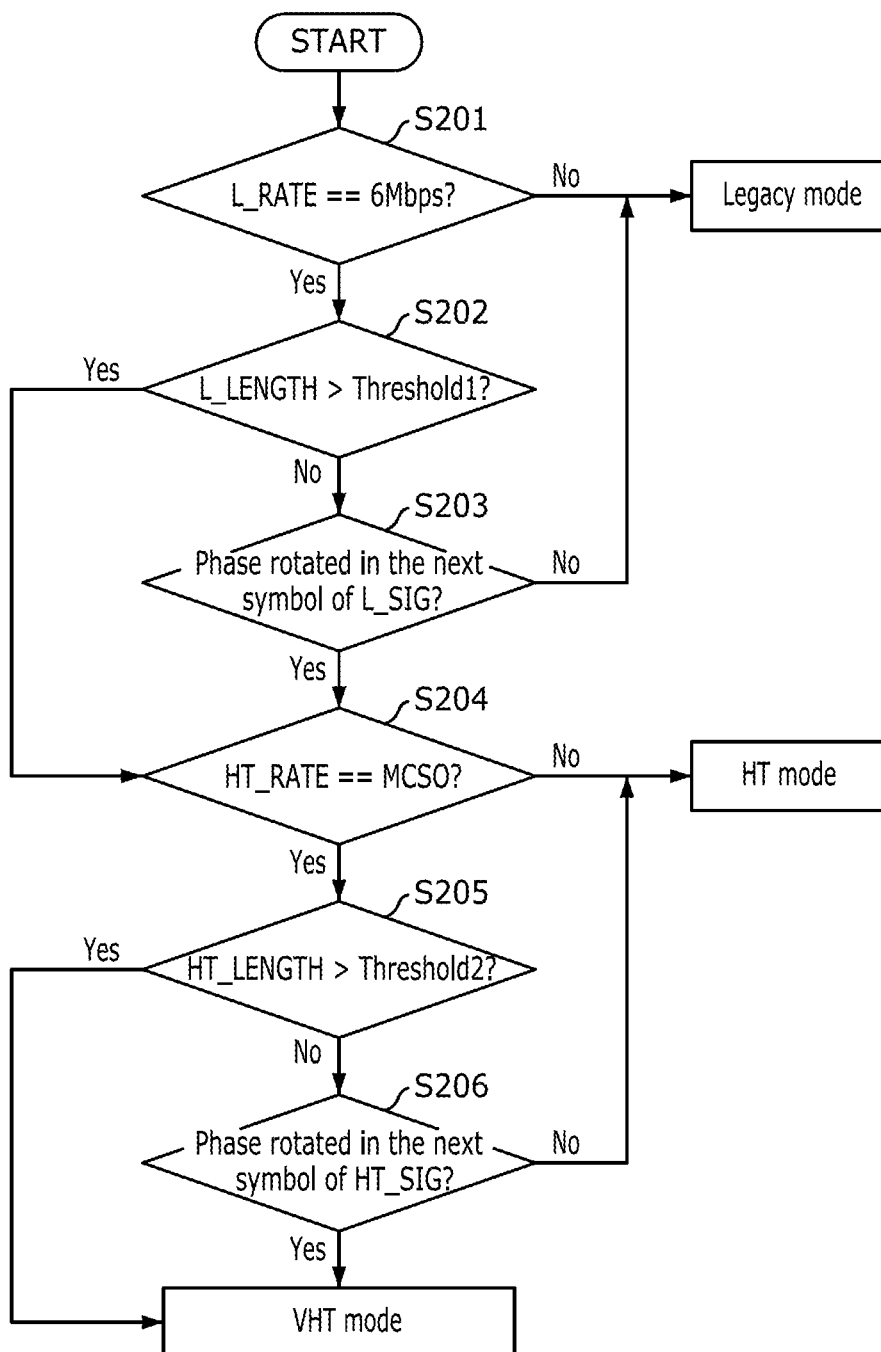
FIG. 2 is a flow diagram illustrating a method for detecting a packet mode by using L-SIG information and HT-SIG information in accordance with an exemplary embodiment of the present invention.

FIG. 2 is a flow diagram illustrating a method for detecting a packet mode by a phase shift by using L-SIG information and HT-SIG information in accordance with an exemplary embodiment of the present invention.

Although FIG. 2 illustrates the case of using both L_RATE and L_LENGTH simultaneously, the case of using only one of the two conditions is also possible. Also, although FIG. 2 illustrates the case of using HT_RATE and HT_LENGTH conditions simultaneously, one of the two conditions may be used. A detailed method for this will be described below in detail.

A threshold value 1 and a threshold value 2 may be set by a programmable register. Because a legacy mode packet does not exceed a 2346-byte length, the threshold value is set to 2346 bytes as a default value. Also, because an HT mode packet exceeds a 65536-byte length in the event of aggregation, the threshold value 2 is set to 65537 bytes.

Referring to FIG. 2, if L_RATE is not set to 6 Mbps (in step S201), it is determined to be a legacy mode packet. If L_RATE is set to 6 Mbps (in step S201), the method compares L_LENGTH and the threshold value 1 (step S202). If the L_LENGTH is smaller than the threshold value 1, the method determines whether the tone in a symbol following an L-SIG field is phase-rotated (step S203).

If the tone in a symbol following an L-SIG field is not phase-rotated, it is determined to be a legacy mode packet. If the tone in a symbol following an L-SIG field is phase-rotated, the method determines whether HT_RATE is set to MCS0 (step S204). If the L_LENGTH is greater than the threshold value 1, the method determines whether HT_RATE is set to MCS0 (step S204).

If HT_RATE is not set to MCS0 (step S204), it is determined to be an HT mode packet. If HT_RATE is set to MCS0 (step S204), the method compares the HT_LENGTH and the threshold value 2 (step S205). If the HT_LENGTH is smaller than the threshold value 2, the method determines whether the tone in a symbol following an HG-SIG field is phase-rotated (step S206). If the tone in a symbol following an HG-SIG field is not phase-rotated, it is determined to be an HT mode packet. If the tone in a symbol following an HG-SIG field is phase-rotated, it is determined to be a VHT mode packet. If the HT_LENGTH is greater than the threshold value 2, it is determined to be a VHT mode packet.

In FIG. 2, if the L_RATE is not used, the method performs an operation of comparing the L_LENGTH and the threshold value 1; and if the L_LENGTH is not used, the method performs the step S203 after the step S201. Likewise, if the HT_RATE is not used, the method performs an operation of comparing the HT_LENGTH and the threshold value 2; and if the HT_LENGTH is not used, the method performs the step S206 after the step S204.

Figure 3:
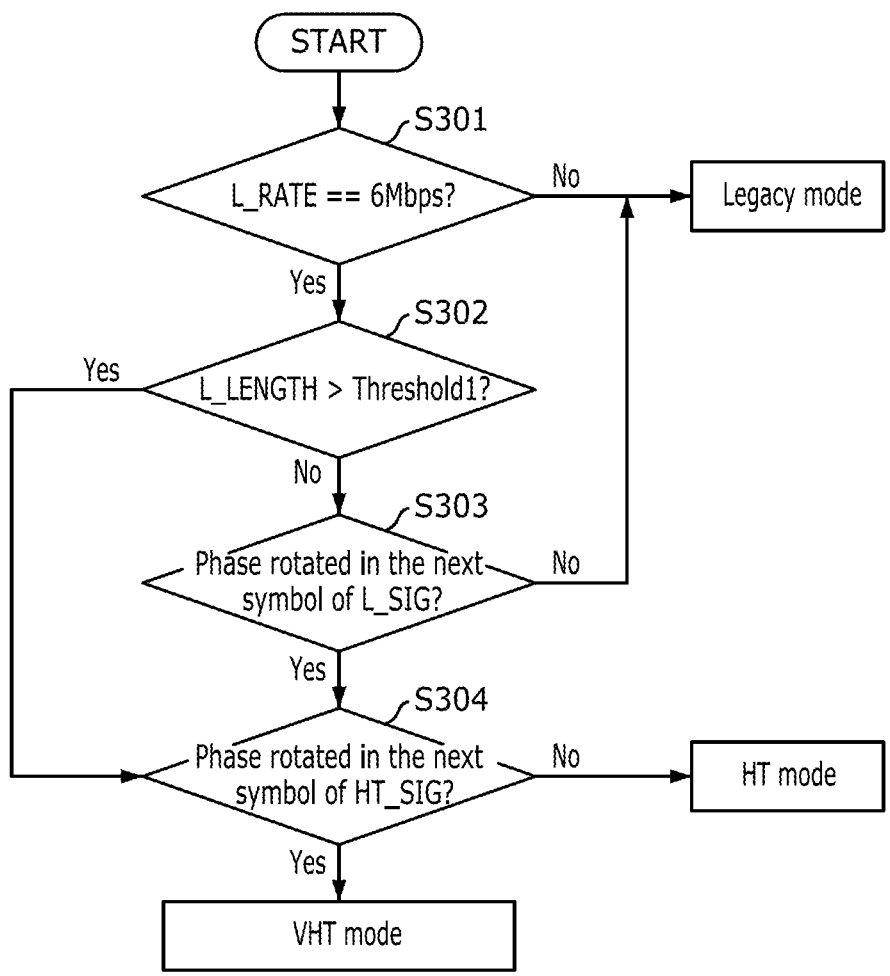
FIG. 3 is a flow diagram illustrating a method for detecting a packet mode by using L-SIG information in accordance with an exemplary embodiment of the present invention.

FIG. 3 is a flow diagram illustrating a method for detecting a packet mode by a phase shift by using L-SIG information in accordance with an exemplary embodiment of the present invention.

Although FIG. 3 illustrates the case of using the L_RATE and the L_LENGTH simultaneously, only one of the two conditions may be used.

Referring to FIG. 3, if the L_RATE is not set to 6 Mbps (step S301), it is determined to be a legacy mode packet. If the L_RATE is set to 6 Mbps (step S301), the method compares the L_LENGTH and the threshold value 1 (step S302). If the L_LENGTH is smaller than the threshold value 1, the method determines whether the tone in a symbol following the L-SIG field is phase-rotated (step S303).

If the tone in a symbol following the L-SIG field is not phase-rotated, it is determined to be a legacy mode packet. If the tone in a symbol following the L-SIG field is phase-rotated (step S303), the method determines whether the tone in a symbol following the HT-SIG field is phase-rotated (step S304).

If the tone in a symbol following the HT-SIG field is not phase-rotated, it is determined to be an HT mode packet. If the tone in a symbol following the HT-SIG field is phase-rotated, it is determined to be a VHT mode packet.

In FIG. 3, if the L_RATE is not used, the method performs an operation of comparing the L_LENGTH and the threshold value 1; and if the L_LENGTH is not used, the method performs the step S303 after the step S301.

Figure 4:
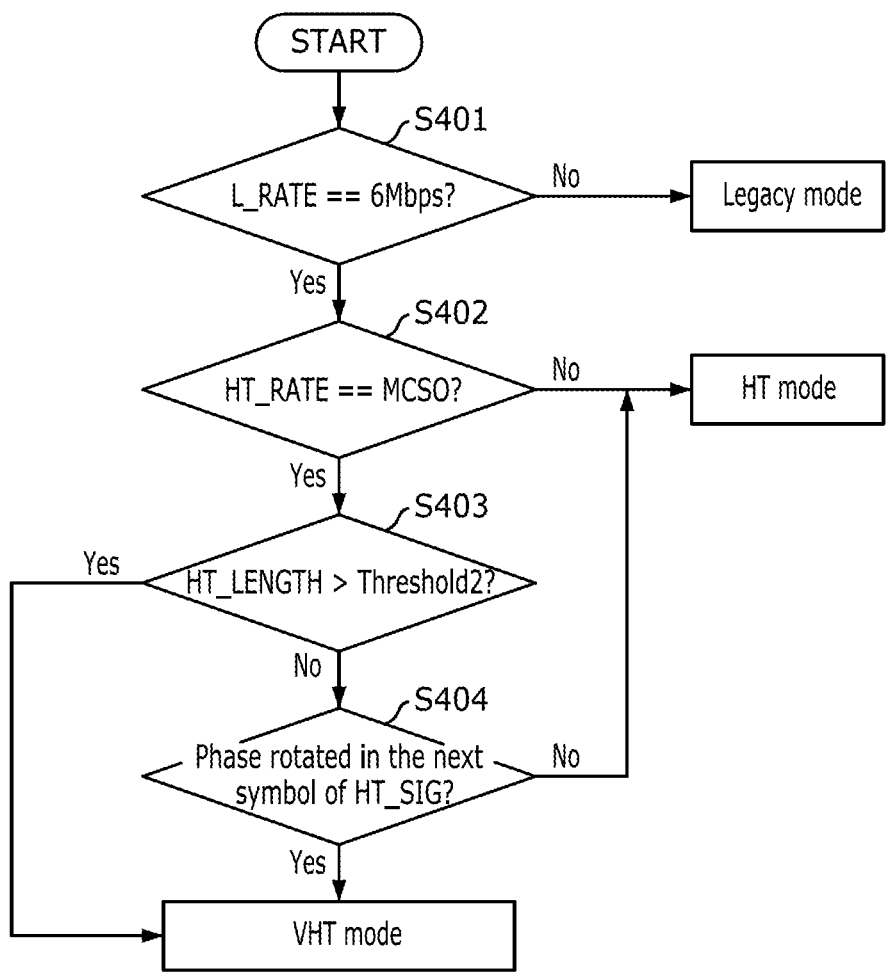
FIG. 4 is a flow diagram illustrating a method for detecting a packet mode by using HT-SIG information in accordance with an exemplary embodiment of the present invention.

FIG. 4 is a flow diagram illustrating a method for detecting a packet mode by a phase shift by using HT-SIG information in accordance with an exemplary embodiment of the present invention.

Although FIG. 4 illustrates the case of using the HT_RATE and the HT_LENGTH simultaneously, only one of the two conditions may be used.

Referring to FIG. 4, if the L_RATE is not set to 6 Mbps (step S401), it is determined to be a legacy mode packet. If the L_RATE is set to 6 Mbps (step S401), the method determines whether HT_RATE is set to MCS0 (step S402).

If HT_RATE is not set to MCS0 (step S402), it is determined to be an HT mode packet. If HT_RATE is set to MCS0 (step S402), the method compares the HT_LENGTH and the threshold value 2 (step S403). If the HT_LENGTH is smaller than the threshold value 2, the method determines whether the tone in a symbol following an HG-SIG field is phase-rotated (step S404).

If the tone in a symbol following an HG-SIG field is not phase-rotated, it is determined to be an HT mode packet. If the tone in a symbol following an HG-SIG field is phase-rotated, it is determined to be a VHT mode packet. Also, if the HT_LENGTH is greater than the threshold value 2, it is determined to be a VHT mode packet.

In FIG. 4, if the HT_RATE is not used, the method performs an operation of comparing the HT_LENGTH and the threshold value 2; and if the HT_LENGTH is not used, the method performs the step S404 after the step S402.

FIGS. 2 to 4 illustrate methods for detecting a packet mode by a phase shift on the basis of the packet length information or the data rate information of the signal field. However, the packet mode may also be detected by using the packet length information and the data rate information of the signal field according to a phase shift type.

Figure 5:
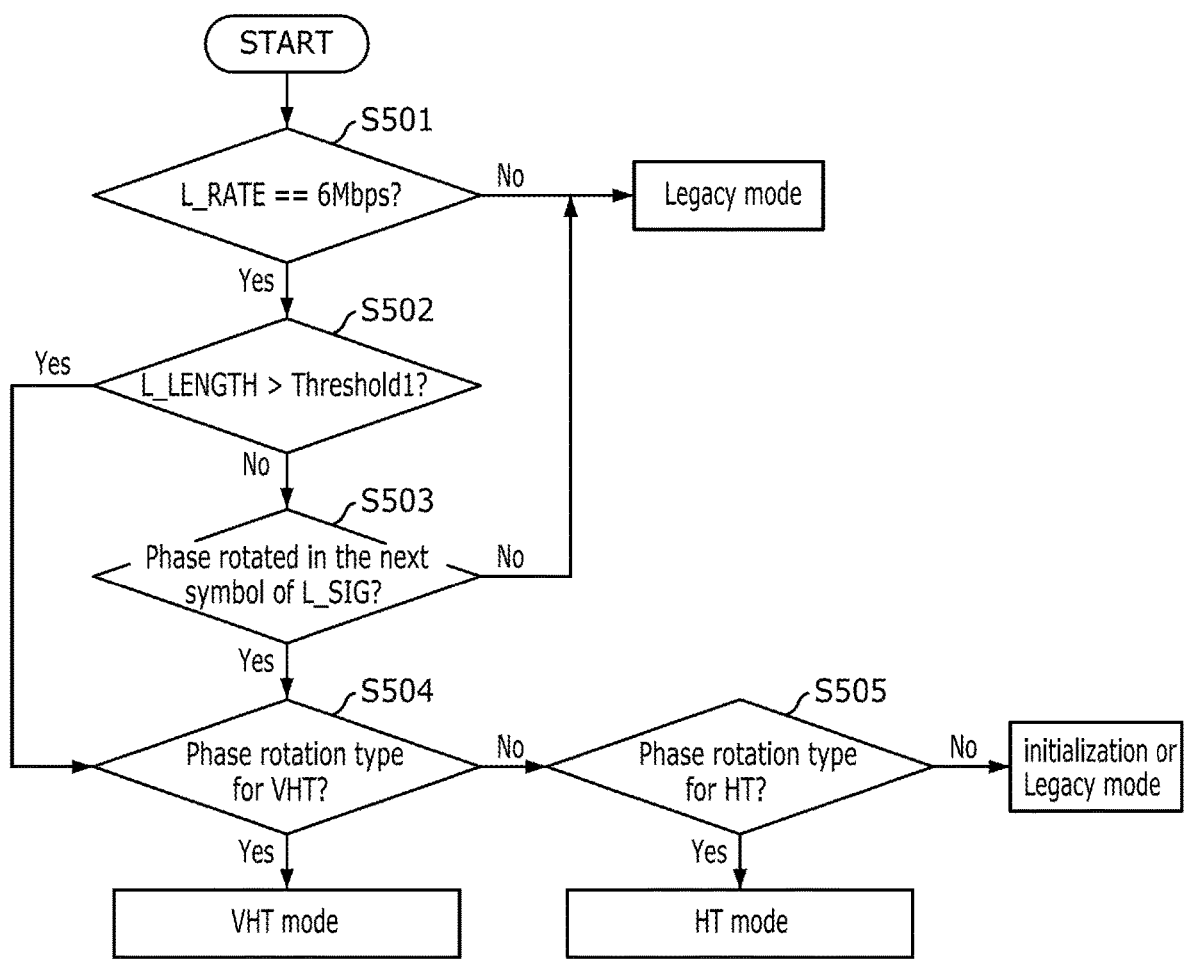
FIG. 5 is a flow diagram illustrating a method for detecting a packet mode by using L-SIG information and phase rotation type information in accordance with an exemplary embodiment of the present invention.

FIG. 5 is a flow diagram illustrating a method for detecting a packet mode by using packet length information and data rate information of a signal field according to a phase shift type in accordance with an exemplary embodiment of the present invention.

Referring to FIG. 5, if the L_RATE is not set to 6 Mbps (step S501), it is determined to be a legacy mode packet. If the L_RATE is set to 6 Mbps (step S501), the method compares the L_LENGTH and the threshold value 1 (step S502). If the L_LENGTH is smaller than the threshold value 1, the method determines whether the tone in a symbol following the L-SIG field is phase-rotated (step S503).

If the tone in a symbol following the L-SIG field is not phase-rotated, it is determined to be a legacy mode packet. If the tone in a symbol following the L-SIG field is phase-rotated (step S503), the method determines whether it is a VHT mode phase rotation type (step S504). Also, if the L_LENGTH is greater than the threshold value 1, the method determines whether it is a VHT mode phase rotation type (step S504).

If it is a VHT mode phase rotation type (step S504), it is determined to be a VHT mode packet. If it is not a VHT mode phase rotation type but an HT mode phase rotation type (step S505), it is determined to be an HT mode. If it is not an HT mode phase rotation type (step S505), it is determined to be an initialization mode or a legacy mode.

Meanwhile, the 802.11a/g mode (legacy mode) can support up to 20 MHz, and the 802.11n mode (HT mode) can support up to 40 MHz, and the VHT mode can support up to 80 MHz. Thus, on the basis of these facts, the present invention may determine a packet mode in the following manner.

1) A legacy mode packet or an HT mode packet or a VHT mode packet for a 20 MHz channel mode packet.

2) An HT mode packet or a VHT mode packet for a 40 MHz channel mode packet.

3) A VHT mode packet for a 80 MHz channel mode packet.

Figure 6:
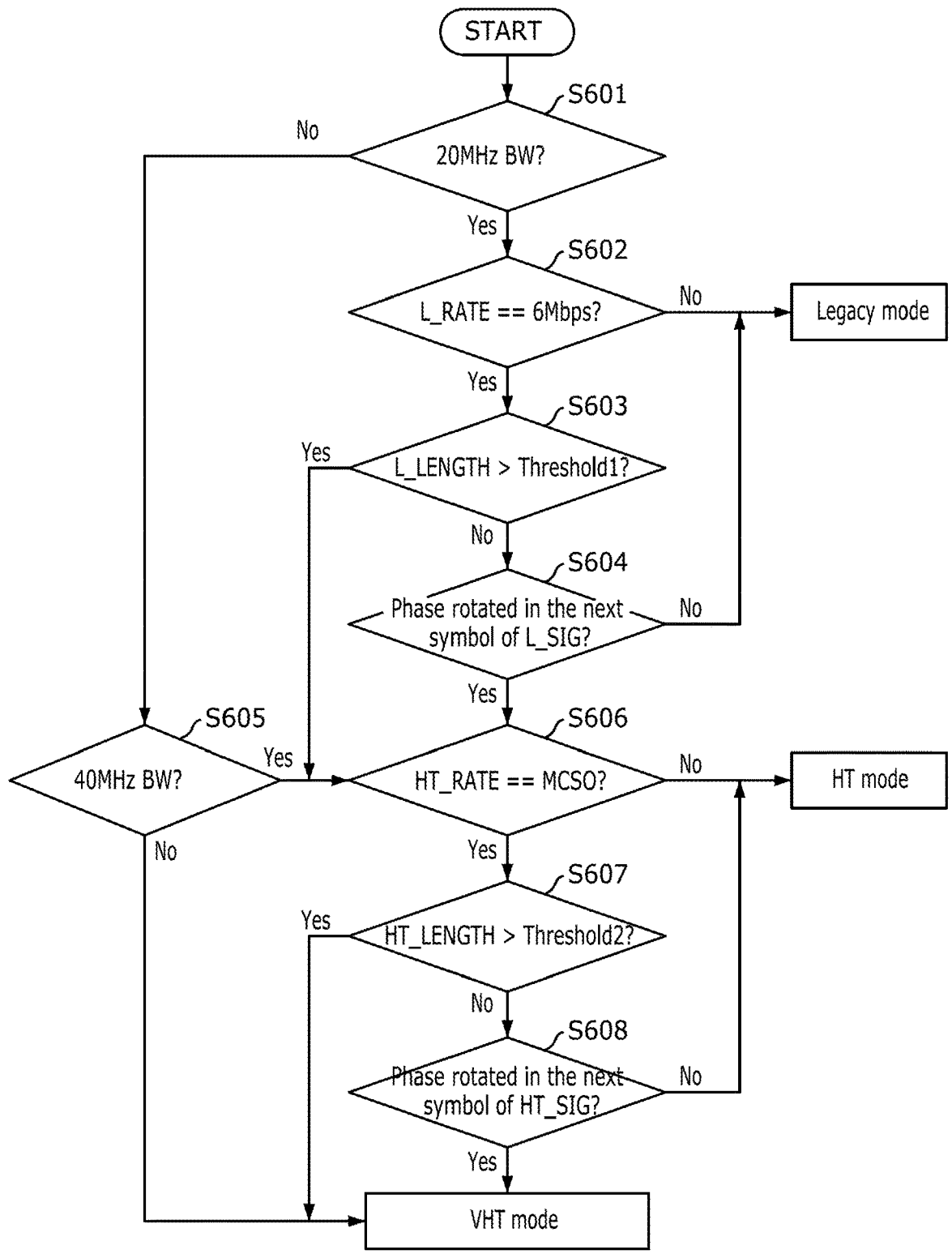
FIG. 6 is a flow diagram illustrating a method for detecting a packet mode by using bandwidth information, L-SIG information and HT-SIG information in accordance with an exemplary embodiment of the present invention.
Figure 7:
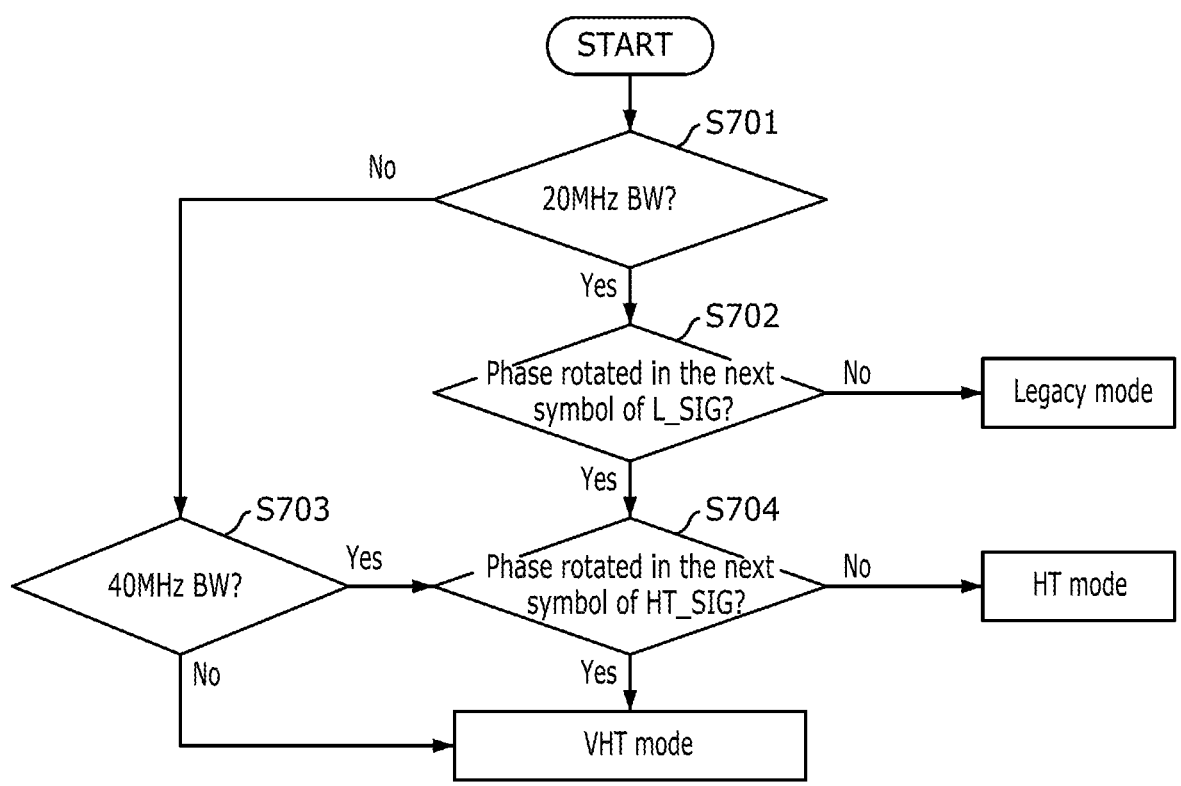
FIG. 7 is a flow diagram illustrating a method for detecting a packet mode by using bandwidth information and phase rotation state information in accordance with an exemplary embodiment of the present invention.

FIGS. 6 and 7 are flow diagrams illustrating a method for detecting a packet mode by a phase shift by using channel information in accordance with an exemplary embodiment of the present invention. A wireless LAN device may detect the bandwidth of a received signal through a carrier sensing circuit, and this operation is performed using a preamble followed by a signal field of the received signal. That is, not only the aforesaid data rate information and packet length information but also phase shift information may be detected as the channel bandwidth information of a TX signal to detect a packet mode.

FIG. 6 is a flow diagram illustrating a method for detecting a packet mode by a phase shift by using both the signal field information and the channel information in accordance with an exemplary embodiment of the present invention. FIG. 7 is a flow diagram illustrating a method for detecting a packet mode by a phase shift by using only the channel information in accordance with an exemplary embodiment of the present invention.

Although FIGS. 6 and 7 illustrate the case of determining whether it is a 20 MHz bandwidth or a 40 MHz bandwidth, only one of the two conditions may be used.

Referring to FIG. 6, if the channel bandwidth is determined to be 20 MHz by using a preamble (step S601), the method determines whether the L_RATE is set to 6 Mbps (step S602). If the L_RATE is not set to 6 Mbps (step S602), it is determined to be a legacy mode packet. If the L_RATE is set to 6 Mbps (step S602), the method compares the L_LENGTH and the threshold value 1 (step S603). If the L_LENGTH is smaller than the threshold value 1, the method determines whether the tone in a symbol following the L-SIG field is phase-rotated (step S604).

If the tone in a symbol following the L-SIG field is not phase-rotated, it is determined to be a legacy mode packet. If the tone in a symbol following the L-SIG field is phase-rotated, the method determines whether the HT_RATE is set to MCS0 (step S606).

Also, if the channel bandwidth is determined to be 40 MHz by using a preamble (step S605), the method determines whether the HT_RATE is set to MCS0 (step S606). If the channel bandwidth is determined to be not 40 MHz by using a preamble (step S605), it is determined to be a VHT mode packet.

On the other hand, if the HT_RATE is not set to MCS0 (step S606), it is determined to be an HT mode packet. If the HT_RATE is not set to MCS0 (step S606), the method compares the HT_LENGTH and the threshold value 2 (step S607). If the HT_LENGTH is smaller than the threshold value 2, the method determines whether the tone in a symbol following the HT-SIG field is phase-rotated (step S608).

If the tone in a symbol following the HT-SIG field is not phase-rotated, it is determined to be an HT mode packet. If the tone in a symbol following the HT-SIG field is phase-rotated, it is determined to be a VHT mode packet. Also, if the HT_LENGTH is greater than the threshold value 2 (step S607), it is determined to be a VHT mode packet.

Although FIG. 6 illustrates the case of using both of the L_RATE and the L_LENGTH and using both of the HT_RATE and the HT_LENGTH, only one of the two conditions may be used as described with reference to FIG. 2.

Referring to FIG. 7, if the channel bandwidth is determined to be 20 MHz by using a preamble (step S701), the method determines whether the tone in a symbol following the L-SIG field is phase-rotated (step S702).

If the tone in a symbol following the L-SIG field is not phase-rotated (step S702), it is determined to be a legacy mode packet. If the tone in a symbol following the L-SIG field is phase-rotated (step S702), the method determines whether the tone in a symbol following the HT-SIG field is phase-rotated (step S704).

If the tone in a symbol following the HT-SIG field is not phase-rotated (step S704), it is determined to be an HT mode packet. If the tone in a symbol following the HT-SIG field is phase-rotated (step S704), it is determined to be a VHT mode packet.

Meanwhile, if the channel bandwidth is determined to be 40 MHz by using a preamble (step S703), the method determines whether the tone in a symbol following the HT-SIG field is phase-rotated (step S704). If the channel bandwidth is determined to be not 40 MHz by using a preamble (step S703), it is determined to be a VHT mode packet.

Figure 8:
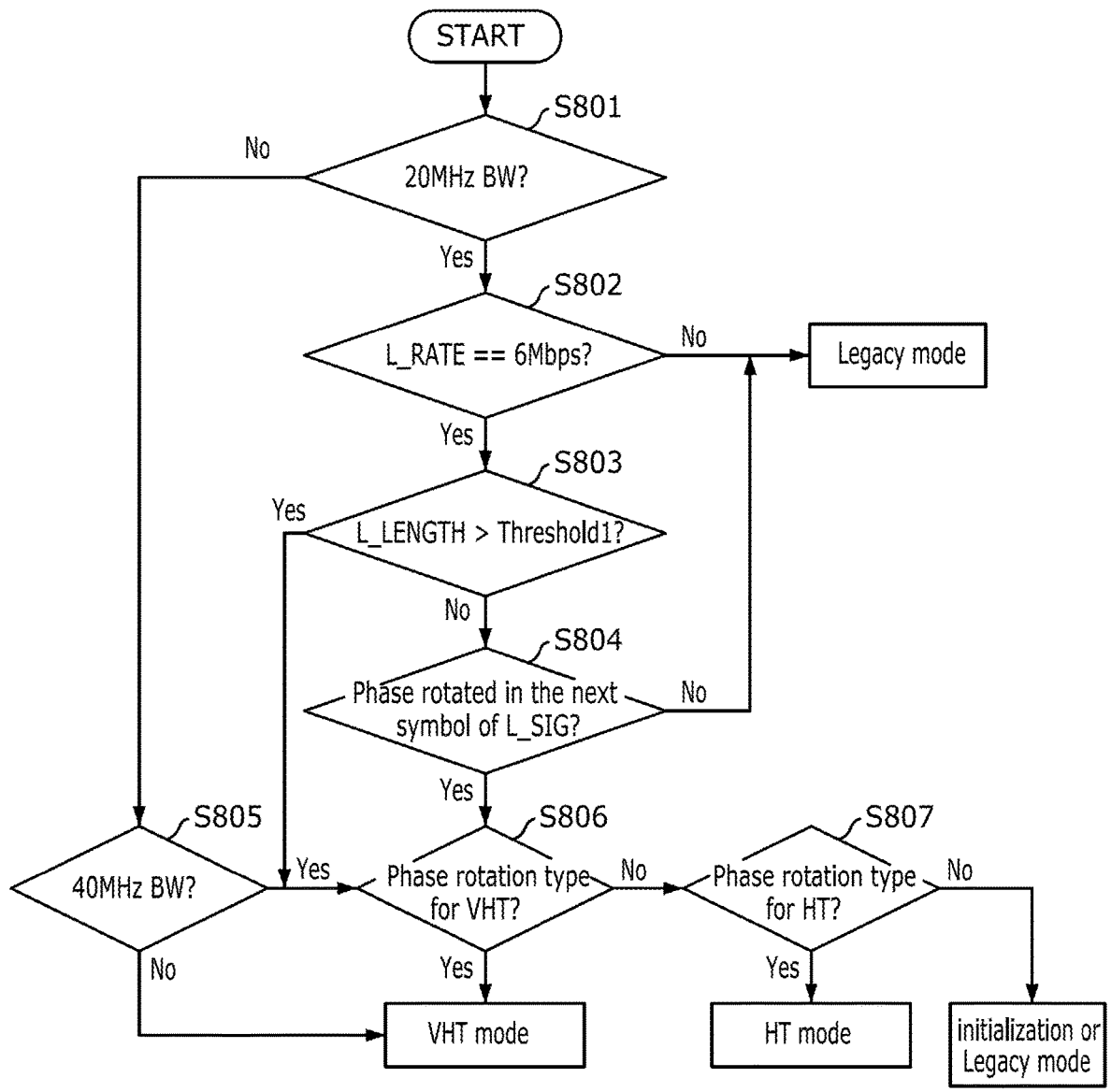
FIG. 8 is a flow diagram illustrating a method for detecting a packet mode by using bandwidth information, L-SIG information and phase rotation type information in accordance with an exemplary embodiment of the present invention.

FIG. 8 is a flow diagram illustrating a packet mode detection method in accordance with an exemplary embodiment of the present invention when a VHT compatible part follows the L-SIG.

Like the case of FIG. 7, the case of FIG. 8 may not use the packet length information or the data rate information of the signal field information.

Referring to FIG. 8, if the channel bandwidth is determined to be 20 MHz by using a preamble (step S801), the method determines whether the L_RATE is set to 6 Mbps (step S802). If the L_RATE is not set to 6 Mbps (step S802), it is determined to be a legacy mode packet. If the L_RATE is set to 6 Mbps (step S802), the method compares the L_LENGTH and the threshold value 1 (step S803).

If the L_LENGTH is smaller than the threshold value 1, the method determines whether the tone in a symbol following the L-SIG field is phase-rotated (step S804). If the tone in a symbol following the L-SIG field is not phase-rotated (step S804), it is determined to be a legacy mode packet.

If the tone in a symbol following the L-SIG field is phase-rotated (step S804), the method determines whether it is a VHT mode phase rotation type (step S806). Also, if the L_LENGTH is greater than the threshold value 1 (step S803), the method determines whether it is a VHT mode phase rotation type (step S806).

Also, if the channel bandwidth is determined to be 40 MHz by using a preamble (step S805), the method determines whether it is a VHT mode phase rotation type (step S806). If the channel bandwidth is determined to be not 40 MHz by using a preamble (step S805), it is determined to be a VHT mode packet.

On the other hand, if it is a VHT mode phase rotation type (step S806), it is determined to be a VHT mode packet. If it is not a VHT mode phase rotation type but an HT mode phase rotation type (step S807), it is determined to be an HT mode packet. If it is not an HT mode phase rotation type (step S807), it is determined to be an initialization mode or a legacy mode.

A description has been given of a method for automatically detecting a packet mode according to the signal field information and the channel type information. Hereinafter, a description will be given of a method for automatically detecting a packet mode by rotating a pilot tone and/or a data tone of a signal field.

Figure 9:
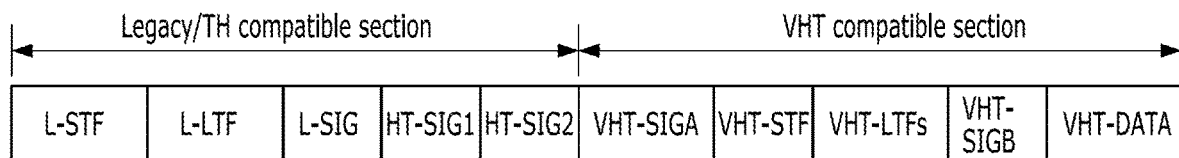
FIG. 9 is a diagram illustrating a VHT mode frame structure.

FIG. 9 is a diagram illustrating a frame structure for a VHT mode that is under discussion by IEEE 802.11 TGac for a VHT mode wireless LAN service.

As illustrated in FIG. 9, a VHT frame includes a legacy and/or HT compatible part and a VHT compatible part or a VHT mode. The legacy and/or HT compatible part includes a short legacy preamble L-SF, a long legacy preamble L-LTF, and a legacy signal field L-SIG. Also, the legacy and/or HT compatible part may selectively include HT signal fields HT-SIG1 and HT-SIG2. The VHT compatible part includes: a VHT-SIGA field that is a signal field receivable by all of legacy mode terminals, HT mode terminals and VHT mode terminals; a VHT-LTF field, a VHT-SIGB field; a VHT data field; and a VHT-STF field receivable only by VHT mode terminals.

In order to automatically detect a packet mode in the multi-mode packet frame structure, the present invention provides a data tone phase modulation transmission scheme and/or a pilot tone phase modulation transmission scheme.

Hereinafter, a description will be given of packet mode detection methods using phase rotation of a data tone and/or a pilot tone in accordance with various exemplary embodiments of the present invention. In the drawings, for convenience in description, a data tone is represented by a circle and a pilot tone with a value of −1 or +1 is represented by an asterisk.

In FIGS. 10 to 13, a conventional IEEE 802.11a/g signal field L-SIG modulates a data tone and a pilot tone by a BPSK modulation scheme prior to transmission. Also, an IEEE 802.11n signal field HT-SIG modulates a pilot tone by a BPSK scheme prior to transmission and modulates a data tone by a Q-BPSK modulation scheme. Accordingly, a packet mode may be detected by detecting whether the phase of a field following an L-SIG field is rotated.

Figure 10:
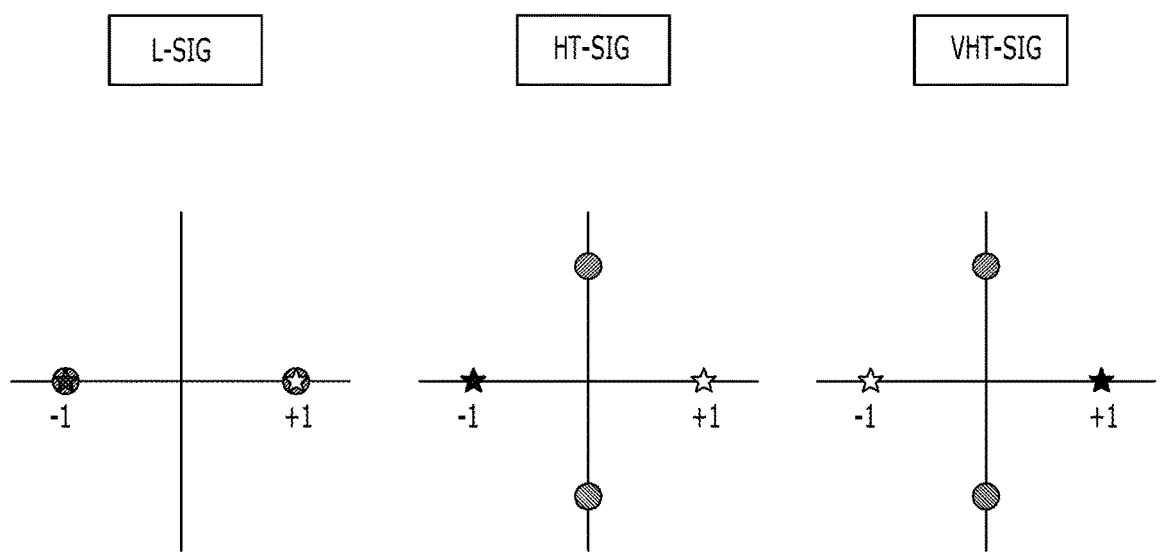
FIG. 10 is a diagram illustrating a process for detecting a packet mode through signal field transmission by 180-degree phase rotation of a pilot tone in accordance with an exemplary embodiment of the present invention.

FIG. 10 is a diagram illustrating a method for detecting a packet mode through signal field transmission by phase rotation of a pilot tone in accordance with an exemplary embodiment of the present invention.

Referring to FIG. 10, in order to improve the detection reliability of the conventional L-SIG field or HT-SIG field and maintain the compatibility, the present invention provides a method of modulating a data tone of a VHT-SIG field by a 90-degree phase-rotated Q-BPSK modulation scheme and transmitting a pilot tone by 180-degree phase rotation. If the VHT-SIG field is modulated prior to transmission as illustrated in FIG. 10, the terminal can detect a packet mode through the VHT-SIG field, because a data tone has a 90-degree phase difference and a pilot tone has a 180-degree phase difference in comparison with the L-SIG field. Also, if the VHT-SIG field is modulated prior to transmission, the receiving terminal can detect a packet mode with a high reliability due to a 180-degree phase difference of a pilot tone, which must be extracted before a data tone for phase error estimation, in comparison with the HT-SIG field.

The modulation scheme of the VHT-SIG field illustrated in FIG. 10 may be expressed as Equation 1.

$$r^{irx}_{HT-SIG(t)} = \frac{1}{\sqrt{N_{TX} N^{Tone}_{HT-SIG}}} \sum_{n=0}^{1} w_{T_{SYM}}(t - nT_{SYM}) \qquad \text{Eq. 1}$$

-continued
$$\sum_{k=-26}^{26} (jD_{k,n} + p_{n+1}P_k) \exp(j2\pi k \Delta_F (t - nT_{SYM} - T_{GI} - T^{irx}_{CS}))$$

$$r^{irx}_{VHT-SIG(t)} = \frac{1}{\sqrt{N_{TX} N^{Tone}_{VHT-SIG}}}$$

$$\sum_{n=0}^{VHT-SIG_{mixindex}} w_{T_{SYM}}(t - nT_{SYM}) \sum_{k=tone_{min}}^{tone_{max}} (jD_{k,n} - p_{n+1}P_k)$$

$$\exp(j2\pi k \Delta_F (t - nT_{SYM} - T_{GI} - T^{irx}_{CS}))$$

Figure 11:
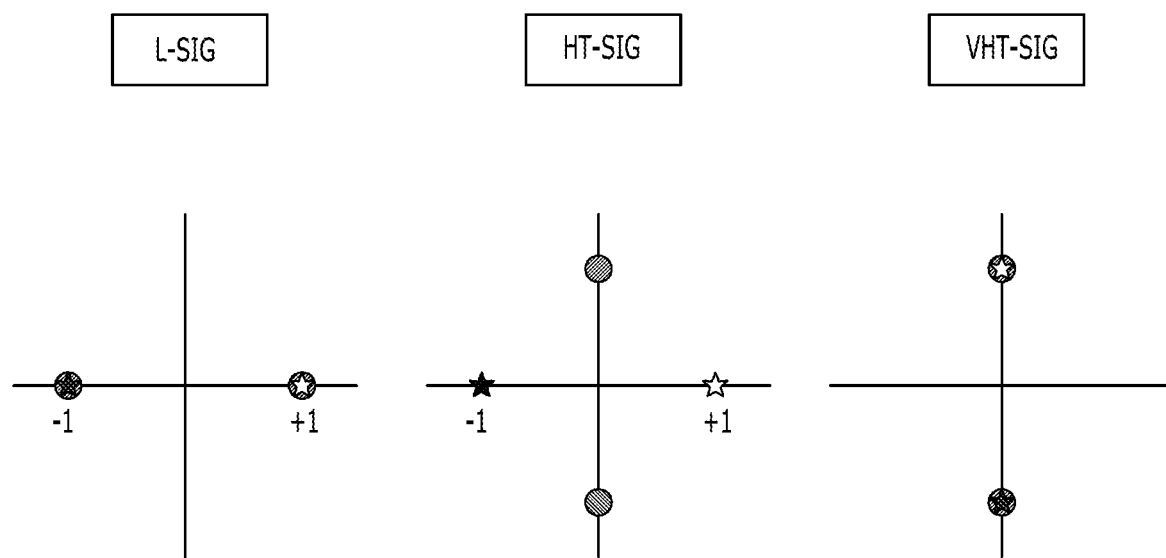
FIG. 11 is a diagram illustrating a process for detecting a packet mode through signal field transmission by 90-degree phase rotation of a pilot tone and a data tone in accordance with an exemplary embodiment of the present invention.

FIG. 11 is a diagram illustrating a method for automatically detecting a packet mode through signal field transmission by phase rotation of a pilot tone and phase rotation of a data tone in accordance with another exemplary embodiment of the present invention.

In comparison with the exemplary embodiment of FIG. 10, the exemplary embodiment of FIG. 11 uses a method of modulating a pilot tone by 90-degree phase rotation, not by 180-degree phase rotation. That is, the exemplary embodiment of FIG. 11 modulates both of the data tone and the pilot tone for the VHT-SIG field by 90-degree phase rotation.

If the VHT-SIG field is modulated prior to transmission as illustrated in FIG. 11, the receiving terminal can detect a packet mode with a high reliability, because the data tone has a 90-degree phase difference and the pilot tone has a 90-degree phase difference in comparison with the L-SIG field and the pilot tone has a 90-degree phase difference in comparison with the HT-SIG field.

The modulation scheme of the VHT-SIG field illustrated in FIG. 11 may be expressed as Equation 2.

$$r^{irx}_{HT-SIG(t)} = \qquad \text{Eq. 2}$$

$$\frac{1}{\sqrt{N_{TX} N^{Tone}_{HT-SIG}}} \sum_{n=0}^{1} w_{T_{SYM}}(t - nT_{SYM}) \sum_{k=-26}^{26} (jD_{k,n} + p_{n+1}P_k)$$

$$\exp(j2\pi k \Delta_F (t - nT_{SYM} - T_{GI} - T^{irx}_{CS}))$$

$$r^{irx}_{VHT-SIG(t)} = \frac{1}{\sqrt{N_{TX} N^{Tone}_{VHT-SIG}}} \sum_{n=0}^{VHT-SIG_{mixindex}} w_{T_{SYM}}(t - nT_{SYM})$$

$$\sum_{k=tone_{min}}^{tone_{max}} (jD_{k,n} + jp_{n+1}P_k)$$

$$\exp(j2\pi k \Delta_F (t - nT_{SYM} - T_{GI} - T^{irx}_{CS}))$$

Figure 12:
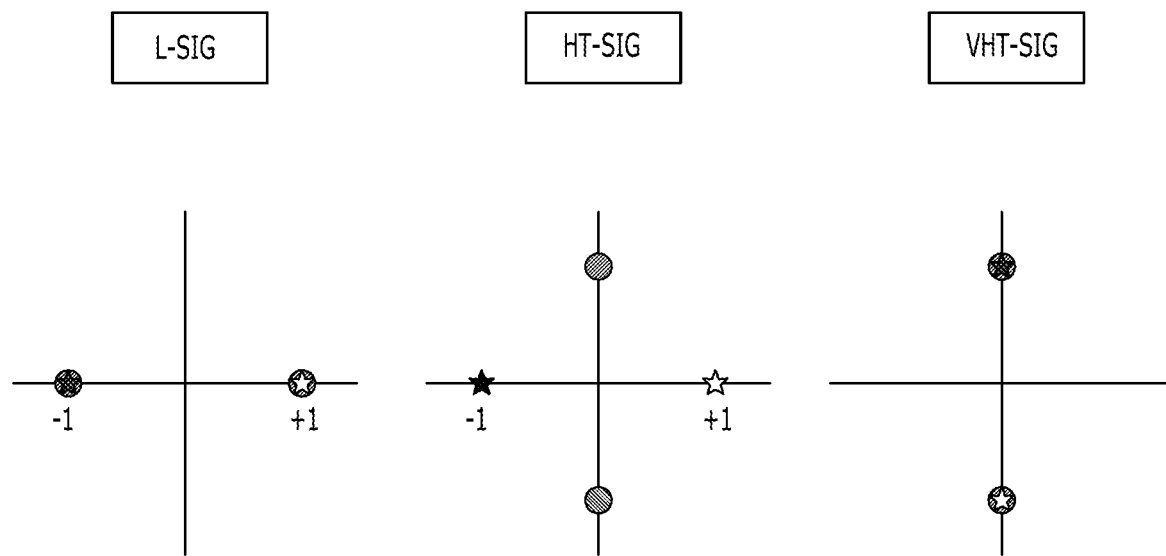
FIG. 12 is a diagram illustrating a process for detecting a packet mode through signal field transmission by 90-degree phase rotation of a data tone and 270-degree phase rotation of a pilot tone in accordance with an exemplary embodiment of the present invention.

FIG. 12 is a diagram illustrating a method for automatically detecting a packet mode through signal field transmission by phase rotation of a data tone and phase rotation of a pilot tone in accordance with another exemplary embodiment of the present invention.

In comparison with the exemplary embodiment of FIG. 11, the exemplary embodiment of FIG. 12 uses a method of modulating a pilot tone by 270-degree phase rotation, not by 90-degree phase rotation. That is, the exemplary embodiment of FIG. 12 modulates the data tone of the VHT-SIG field by 90-degree phase rotation and modulates the pilot tone of the VHT-SIG field by 270-degree phase rotation.

If the VHT-SIG field is modulated prior to transmission as illustrated in FIG. 12, the receiving terminal can detect a packet mode with a high reliability, because the data tone has a 90-degree phase difference and the pilot tone has a 270-degree phase difference in comparison with the L-SIG field and the pilot tone has a 270-degree phase difference in comparison with the HT-SIG field.

The modulation scheme of the VHT-SIG field illustrated in FIG. 12 may be expressed as Equation 3.

$$r^{irx}_{HT-SIG(t)} = \frac{1}{\sqrt{N_{TX} N^{Tone}_{HT-SIG}}}$$

$$\sum_{n=0}^{1} w_{T_{SYM}}(t - nT_{SYM}) \sum_{k=-26}^{26} (jD_{k,n} + p_{n+1}P_k)\exp|$$

$$(j2\pi k \Delta_F(t - nT_{SYM} - T_{GI} - T^{irx}_{CS}))$$

$$r^{irx}_{VHT-SIG(t)} = \frac{1}{\sqrt{N_{TX} N^{Tone}_{VHT-SIG}}}$$

$$\sum_{n=0}^{VHT-SIG_{mixindex}} w_{T_{SYM}}(t - nT_{SYM}) \sum_{k=tone_{min}}^{tone_{max}} (jD_{k,n} - jp_{n+1}P_k)$$

$$\exp(j2\pi k \Delta_F(t - nT_{SYM} - T_{GI} - T^{irx}_{CS}))$$

Figure 13:
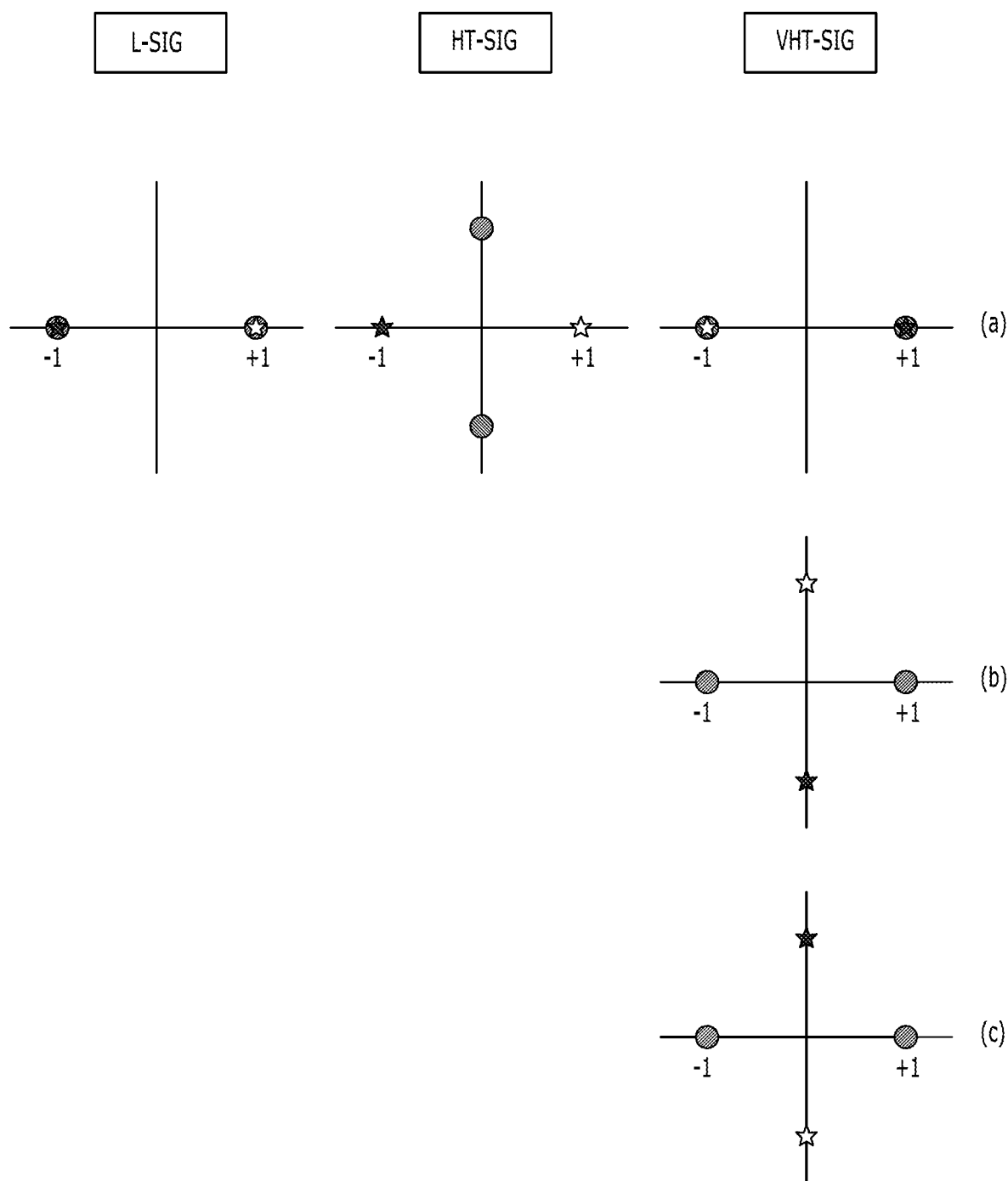
FIG. 13 is a diagram illustrating a process for detecting a packet mode through signal field transmission without phase shift of a data tone in accordance with an exemplary embodiment of the present invention.

FIG. 13 illustrates a method of modulating the data tone in the same manner as the L-SIG and modulating only the pilot tone by 90-degree phase rotation, 180-degree phase rotation, or 270-degree phase rotation. FIG. 3A illustrates the case of rotating only the pilot tone by 180-degree phase rotation. FIG. 13B illustrates the case of rotating only the pilot tone by 90-degree phase rotation. FIG. 13C illustrates the case of rotating only the pilot tone by 270-degree phase rotation.

If the VHT-SIG field is modulated prior to transmission as illustrated in FIG. 13, the receiving terminal can detect a packet mode with a high reliability, because the pilot tone has a 180-degree phase difference, a 90-degree phase difference and a 270-degree phase difference in comparison with the L-SIG field and the data tone has a 90-degree phase difference and the pilot tone has a 180-degree phase difference, a 90-degree phase difference and a 270-degree phase difference in comparison with the HT-SIG field.

In general, because the data tone has no directionality, it may be phase-rotated by 45 degrees (or 135 degrees), by 90 degrees, or by 180 degrees (or 0 degree). Also, because the pilot tone has directionality, it may be phase-rotated by 90 degrees, by 180 degrees, or by 270 degrees.

There are two cases where limited use is available. The first case is that the data tone is 0 degree and the pilot tone is 0 degree. In the case of a frame structure where the VHT-SIG field follows the HT-STF field or the HT-LTF field, this first method may not be used because it is the same as the data field. However, this first method may also be used in the case of a frame structure where the VHT-SIG field follows the HT-SIG field or the L-SIG field. The second case is that the data tone is 90 degrees and the pilot tone is 0 degree. In the case of a frame structure where the VHT-SIG field follows the L-SIG field, this second method may not be used because it is the same as the modulation scheme of the HT-SIG field. However, this second method may be used in the case of a frame structure where the VHT-SIG field follows the HT-SIG field or the HT-STF field or the HT-LTF field.

In general, the IEEE 802.11n-based packet has an HT-SIG field followed by an HT-STF field. Thus, in the case of a VHT mode frame structure where a VHT-SIG field follows an HT-SIG field, it is necessary to discriminate between a VHT-SIG signal and an HT-STF signal of an HT mode.

Figure 14:
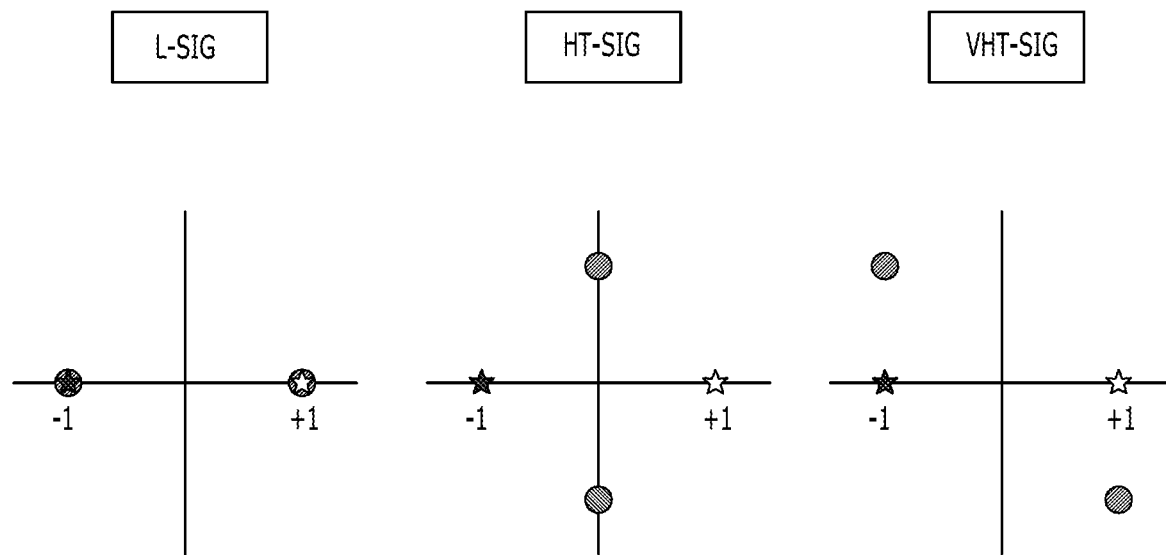
FIG. 14 is a diagram illustrating a process for detecting a packet mode through signal field transmission by 135-degree phase rotation of a data tone in accordance with an exemplary embodiment of the present invention.
Figure 15:
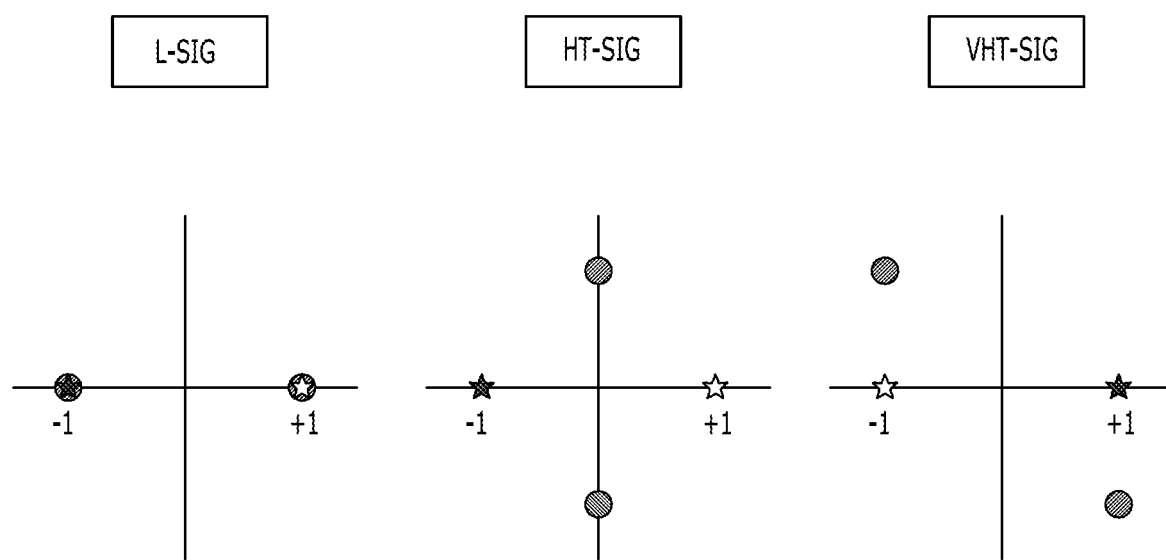
FIG. 15 is a diagram illustrating a process for detecting a packet mode through signal field transmission by 135-degree phase rotation of a data tone and 180-degree phase rotation of a pilot tone in accordance with an exemplary embodiment of the present invention.

FIGS. 14 and 15 are diagrams illustrating a method for detecting a packet mode in a VHT frame structure in which a VHT-SIG field follows an HT-SIG field in accordance with an exemplary embodiment of the present invention.

Referring to FIG. 14, the present invention modulates a pilot tone in the same manner as the conventional L-SIG field and modulates a data tone by 135-degreed phase rotation. The reason for the 135-degreed phase rotation of a data tone is that it can provide a detection threshold value capable of detecting an HT-STF signal and a VHT-SIG signal with a hither reliability because an HT-STF signal is mapped to 1+j or −1−j. That is, by comparing the distribution of RX signals by x=0, y=0, if the RX signals are distributed more in the first quadrant (I value>0, Y value>0) or in the third quadrant (I value<0, Y value<0), the signal may be determined to be an HT-SIG signal; and if the RX signals are distributed more in the second quadrant (I value<0, Y value>0) or in the fourth quadrant (I value>0, Y value<0), the signal may be determined to be an VHT-SIG signal.

The present invention of FIG. 14 can accurately discriminate between an HT-STF signal and a VHT-SIG signal before the processing of the corresponding symbol by a DFT method because the location of a carrier frequency for a signal is known by the characteristics of the HT-STF. The present invention of FIG. 14 is applicable if the HT-SIG is used in the same manner as the conventional HT mixed mode. Also, the method of maintaining 90-degree phase rotation or 0 degree rather than 135-degree phase rotation is more efficient in terms of accuracy in the structure where a VHT-SIG field follows an L-SIG field without an HT-SIG field interposed therebetween.

Meanwhile, the present invention may simultaneously use the 135-degree phase rotation of a data tone and the phase rotation of a pilot tone in order to improve the detection reliability. FIG. 15 illustrates the case of rotating the phase of a data tone by 135 degrees and rotating the phase of a pilot tone by 180 degrees. The present invention includes rotating the phase of a pilot tone by 90 degrees, rotating the phase of a pilot tone by 180 degrees, and rotating the phase of a pilot tone by 270 degrees.

Meanwhile, the present invention includes a method for automatically detecting a packet mode by using a data tone with a 90-degree or 45-degree phase difference and a 180-degree phase inverted pilot tone. Herein, the discrimination between a VHT-SIG signal and an HT-SIG signal is performed using the 90-degree phase difference of a data tone and the 180-degree phase difference of a pilot tone. Also, the discrimination between a VHT-SIG signal and an HT-LTF signal is performed using the 180-degree phase difference of a pilot tone and the 45-degree phase difference of a data tone. Also, the discrimination between a VHT-SIG signal and an HT-SIG (or L-SIG) signal is performed using the 180-degree phase difference of a pilot tone and the 45-degree phase difference of a data tone.

The use of the present invention can support an HT/VHT mixed greenfield mode. Accordingly, a preamble overhead can be reduced and HT-SIG spoofing is possible. Also, it is possible to perform a signal field decoding operation more robust against a noise by using 8-bit CRC. Also, it is possible to secure a very long transmission opportunity using a 16-bit length. Also, it is possible to perform an automatic VHT detection operation using an HT-SIG rate field.

Before describing the features of the present invention, the following abbreviations are described first.

L denotes a subcarrier of a lower band, and U denotes a subcarrier of an upper band. LD denotes a data subcarrier of a lower band, and UD denotes a data subcarrier of an upper band. LP denotes a pilot subcarrier of a lower band, and UP denotes a pilot subcarrier of an upper band. When defining a 20 MHz band mode in a wireless LAN, it is divided into a lower band, an upper band and a center band. The lower band is a band lower than a 40 MHz band. The upper band is a band higher than the 40 MHz band. The center band is a 20 MHz band having a center frequency at the center of the 40 MHz band. The 20 MHz center band mode may use the same method as the 20 MHz lower band mode.

Figure 16:
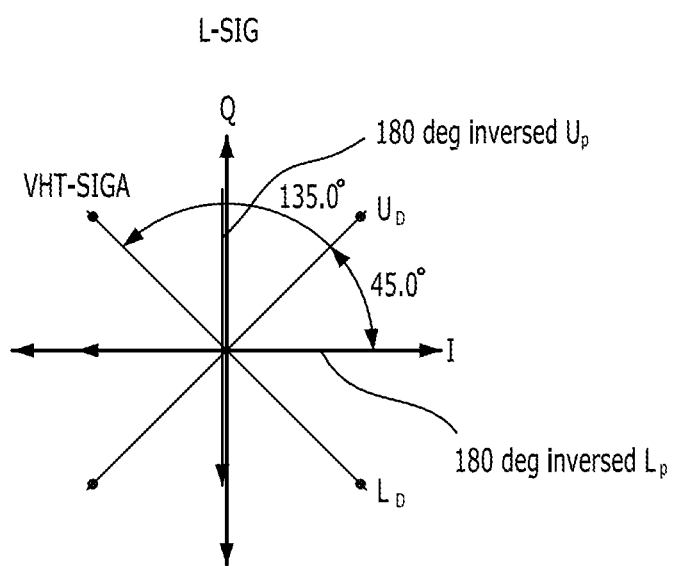
FIG. 16 is a diagram illustrating a process for detecting a packet mode through signal field transmission by 45-degree phase rotation of a data tone and 180-degree phase rotation of a pilot tone in accordance with an exemplary embodiment of the present invention.

FIG. 16 illustrates a method of performing a modulation operation by 45-degree (upper band) or 135-degree (lower band) phase rotation of a data tone for each band (in comparison with the BPSK modulation scheme) and 180-degree phase rotation of a pilot tone in accordance with an exemplary embodiment of the present invention. Herein, the 45-degree and 135-degree phase rotation for each band the 45-degree phase rotation for each band in comparison with the Q-BPSK modulation result.

Figure 17:
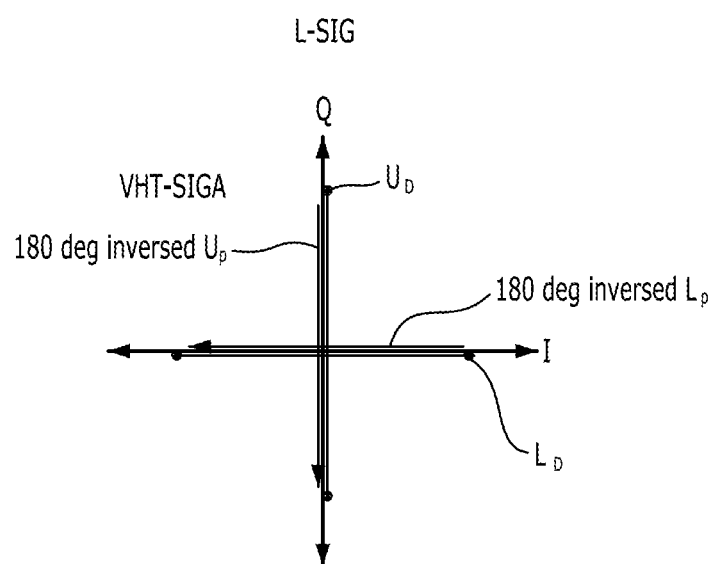
FIG. 17 is a diagram illustrating a process for detecting a packet mode through signal field transmission by 180-degree phase rotation of a pilot tone in accordance with an exemplary embodiment of the present invention.

FIG. 17 illustrates a method of modulating a data tone in the same manner as the BPSK modulation scheme (i.e., no phase rotation) and modulating only a pilot tone by 180-degree phase rotation in accordance with an exemplary embodiment of the present invention.

Figure 18:
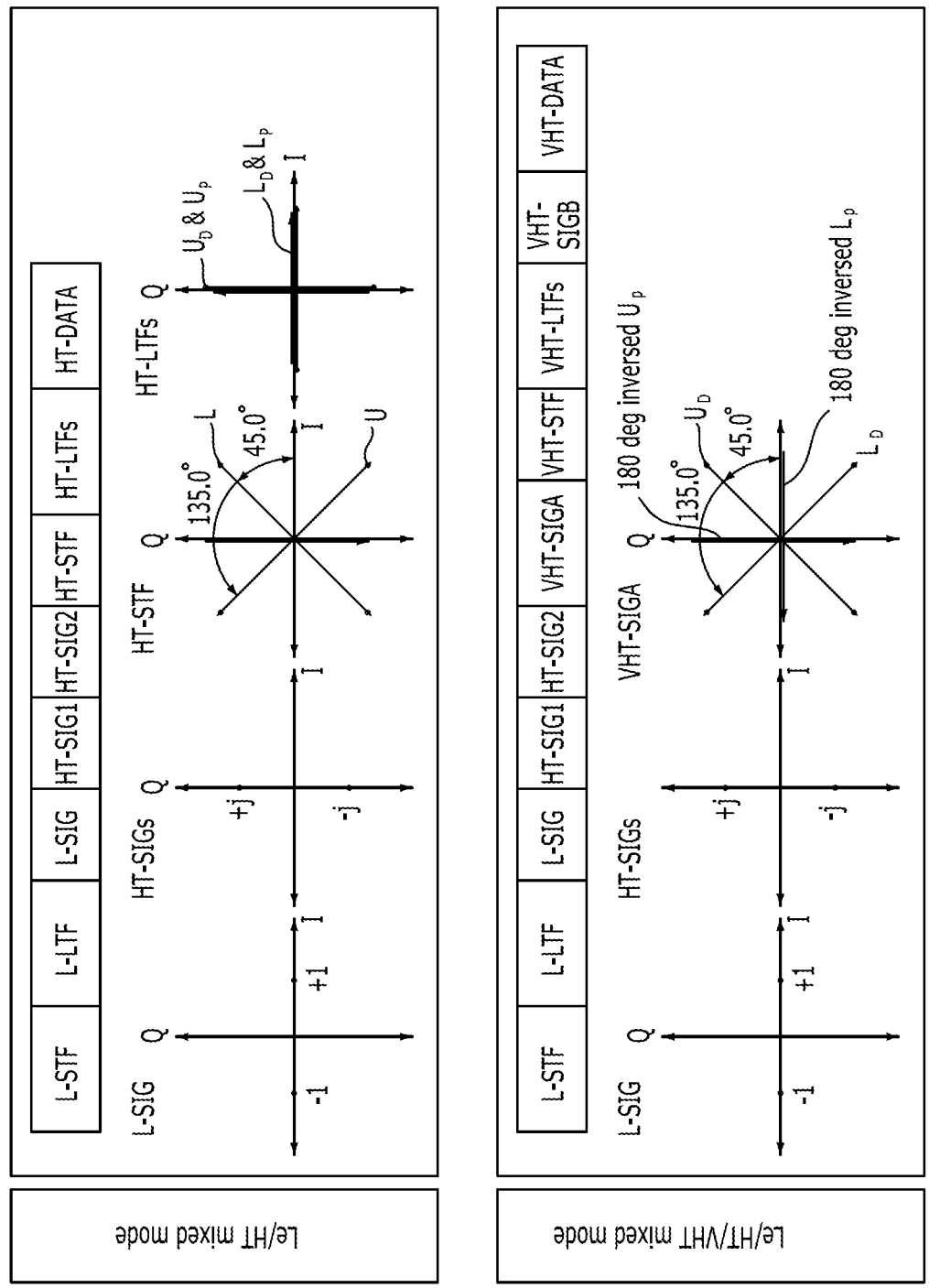
FIG. 18 is a diagram illustrating a method for automatically detecting a VHT mode in a mixed field mode in accordance with an exemplary embodiment of the present invention.

FIG. 18 is a diagram illustrating a method for automatically detecting a VHT mode in a mixed mode in accordance with an exemplary embodiment of the present invention.

In FIG. 18, in the case of a legacy/HT/VHT mixed mode packet, a comparison target is a legacy/HT mixed mode packet. Therefore, a comparison target for automatic detection is the VHT-SIGA of the legacy/HT/VHT mixed mode packet and the HT-STF and HT-LTF of the legacy/HT mixed mode packet. As described above, an automatic mode detection for the first symbol of the VHT-SIGA is performed by using a 45-degree phase rotation modulation scheme of a data tone and a 180-degree phase rotation modulation scheme of a pilot tone. An automatic mode detection for the second symbol of the VHT-SIGA is performed by using the 45-degree phase difference of a data tone and the 180-degree phase difference of a pilot tone.

Figure 19:
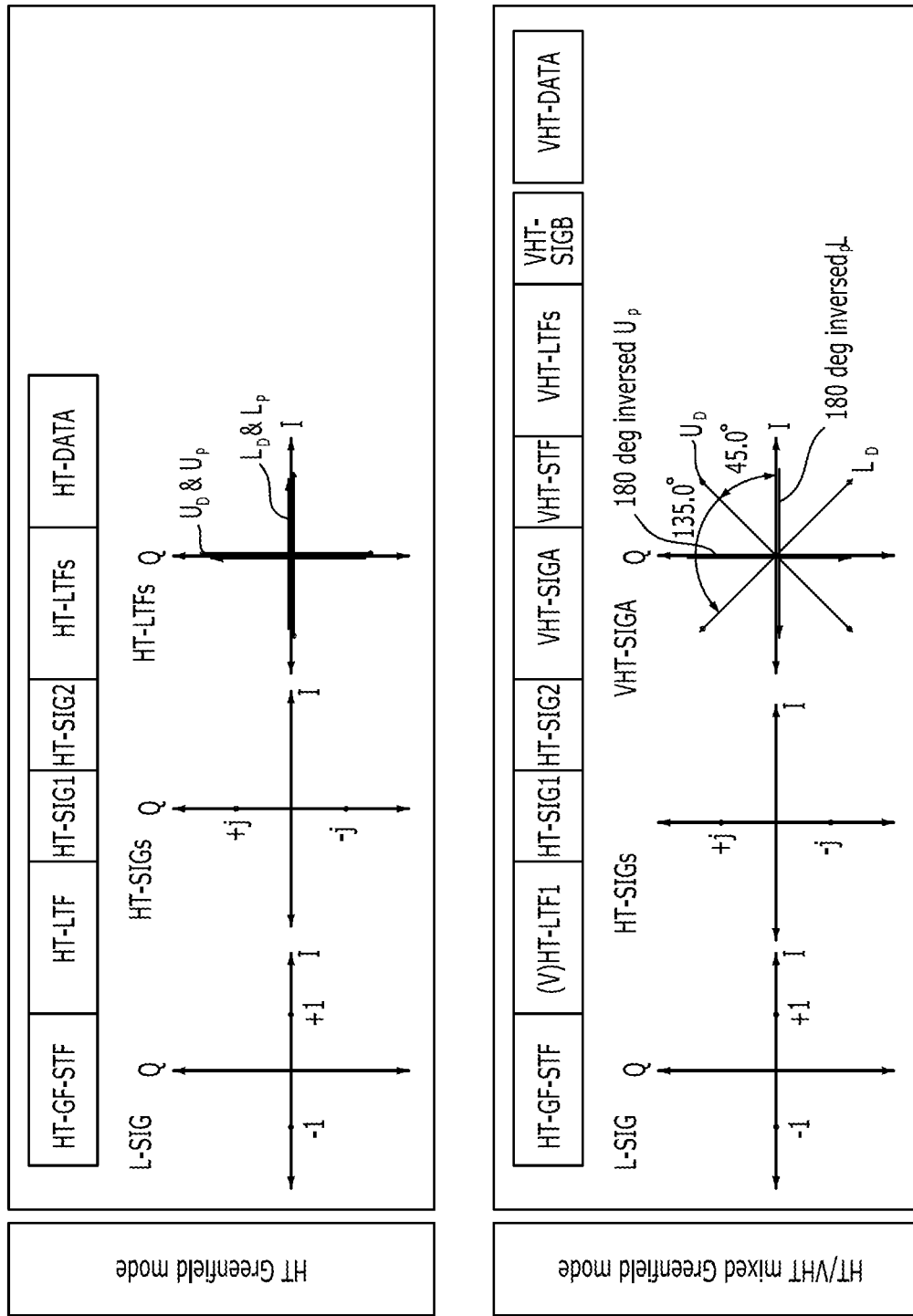
FIG. 19 is a diagram illustrating a method for automatically detecting a VHT mode in a mixed greenfield mode in accordance with an exemplary embodiment of the present invention.

FIG. 19 is a diagram illustrating a method for automatically detecting a HT/VHT mode in a greenfield mode in accordance with an exemplary embodiment of the present invention.

If an HT-SIG field is included in an VHT frame structure, it can support an HT/VHT mixed greenfield mode. The comparison target of an HT/VHT mixed greenfield mode packet is an HT greenfield mode. The reason for this is that the VHT can consider a network environment having only a HT mode and a VHT mode in an environment without a legacy terminal because the green field of the conventional IEEE 802.11n standards means a network state without a legacy terminal. Herein, because an HT terminal of the IEEE 802.11n standards cannot support an VHT mode, it may perform a transmission in an HT greenfield mode. Therefore, the HT/VHT mixed greenfield mode must automatically detect a packet mode in comparison with the HT greenfield mode.

Like the aforesaid VHT-SIGA modulation scheme, the comparison target of a modulated signal is the HT-LTF. Herein, a VHT mode and an HT mode are discriminated by a 45-degree phase-rotated data tone and a 180-degree phase-rotated pilot tone. Herein, in the case of an IEEE 802.11n terminal, an automatic mode detection may be performed using both of the two symbols of the HT-SIG. However, in the case of a VHT terminal, a mode detection must be performed on a symbol basis for detailed gain control of a legacy/HT/VHT mixed greenfield mode.

Specifically, the detailed gain control must be performed on a symbol basis because whether to reflect the calculated detailed gain value must be determined according to the automatic packet mode detection result. The VHT-SIGA of the HT/VHT mixed greenfield mode packet is compared with the HT-LTF of the HT greenfield mode, but the HT-LTF of the HT greenfield mode must be detected on a symbol basis because it can be one symbol.

Recently, the IEEE 802.11 TGac standardization conference is intended to define the VHT-SIGA by two symbols. However, when it is intended to provide the use as an information field to be applied to all users and to define various high-end technologies, it may be short of a 2-symbol length. An exemplary embodiment of the present invention includes an HT-SIG field, and it may be redefined/used for a VHT terminal by reusing a portion of the HT-SIG. To this end, a shared signal field S-SIG is used.

Figure 20:
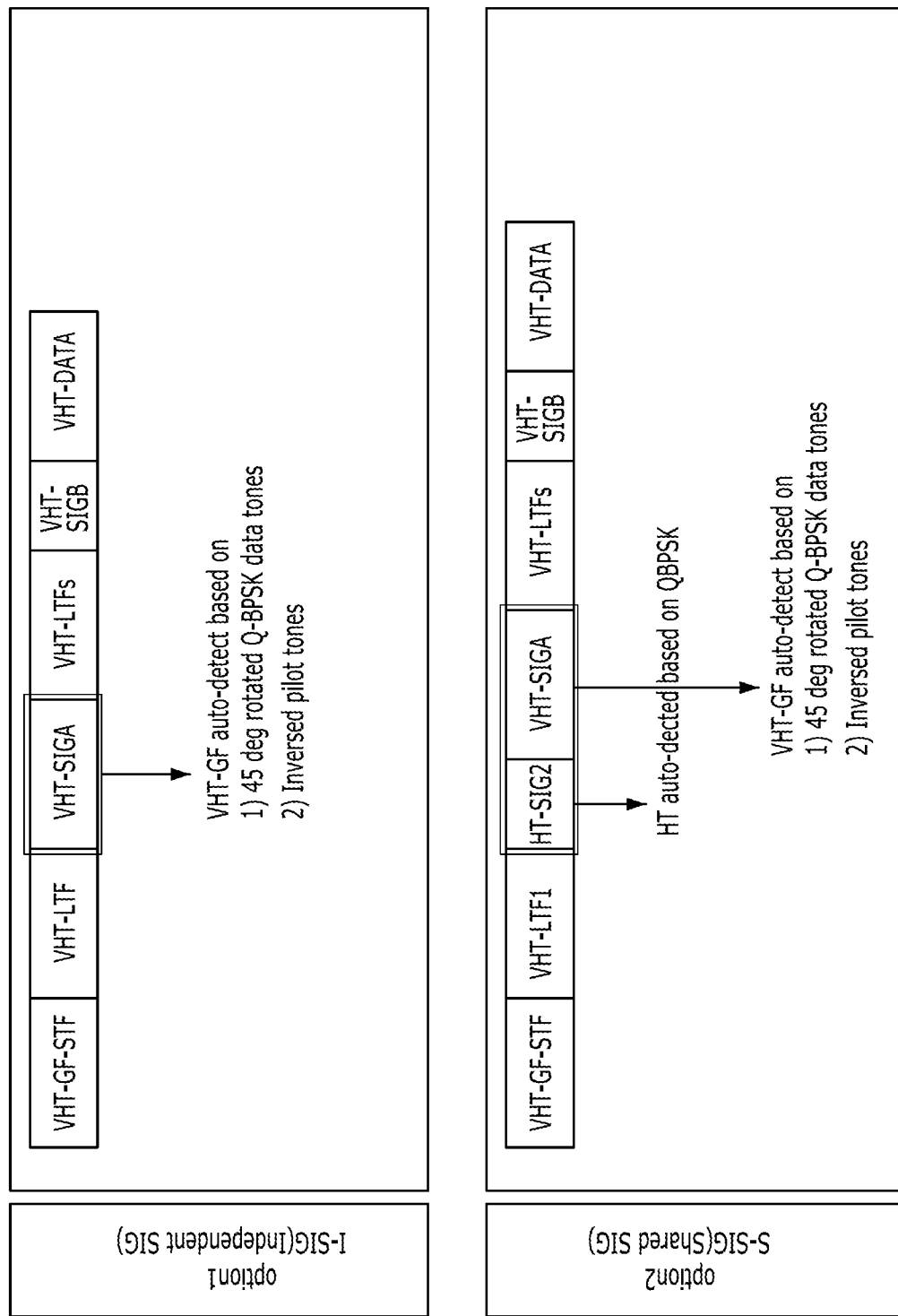
FIG. 20 a diagram illustrating a method for redefining/using HT-SIG2 for VHT in accordance with an exemplary embodiment of the present invention.

FIG. 20 a diagram illustrating a method for redefining/using HT-SIG2 for VHT in accordance with an exemplary embodiment of the present invention.

FIG. 20 illustrates that the HT-SIG2 is redefined/used for the VHT. Likewise, a portion of the HT-SIG is redefined/used for the VHT in the legacy/HT/VHT mixed mode or the HT/VHT mixed greenfield mode, so that the advantages (high-reliability signal demodulation, automatic packet mode detection using HT-SIG information, the possibility of setting a very long transmission opportunity guard interval, and the possibility of supporting the HT/VHT greenfield mode) of the HT-SIG can be used without increasing the number of symbols of the VHT-SIG.

For example, for Smoothing(1), Sounding(1), Reserved (1), Aggregation(1), STBC(2), FEC coding(1), Short GI(1) and Number of extension spatial streams(2), a numeral in the parenthesis may be reused for the VHT as bit number information, and additional bits may be allocated to the VHT-SIG.

If the VHT-SIGA is defined in a two-symbol length, it may be used like the option 1 of FIG. 20. In this case, the greenfield mode can be detected by detecting a 45-degree phase-modulated Q-BPSK signal at the VHT-SIGA field location and detecting a 180-degree phase-inverted pilot.

In addition, another method of the present invention is a rapid mode automatic detection method for the VHT greenfield mode. In the case of VHT-GF-STF, it is a method of performing a transmission by 90-degree phase rotation in comparison with the conventional L-STF or HT-GF-STF. By doing so, the detection of the VHT greenfield mode can be performed immediately after the automatic detection of the VHT-GF-STF.

Figure 21:
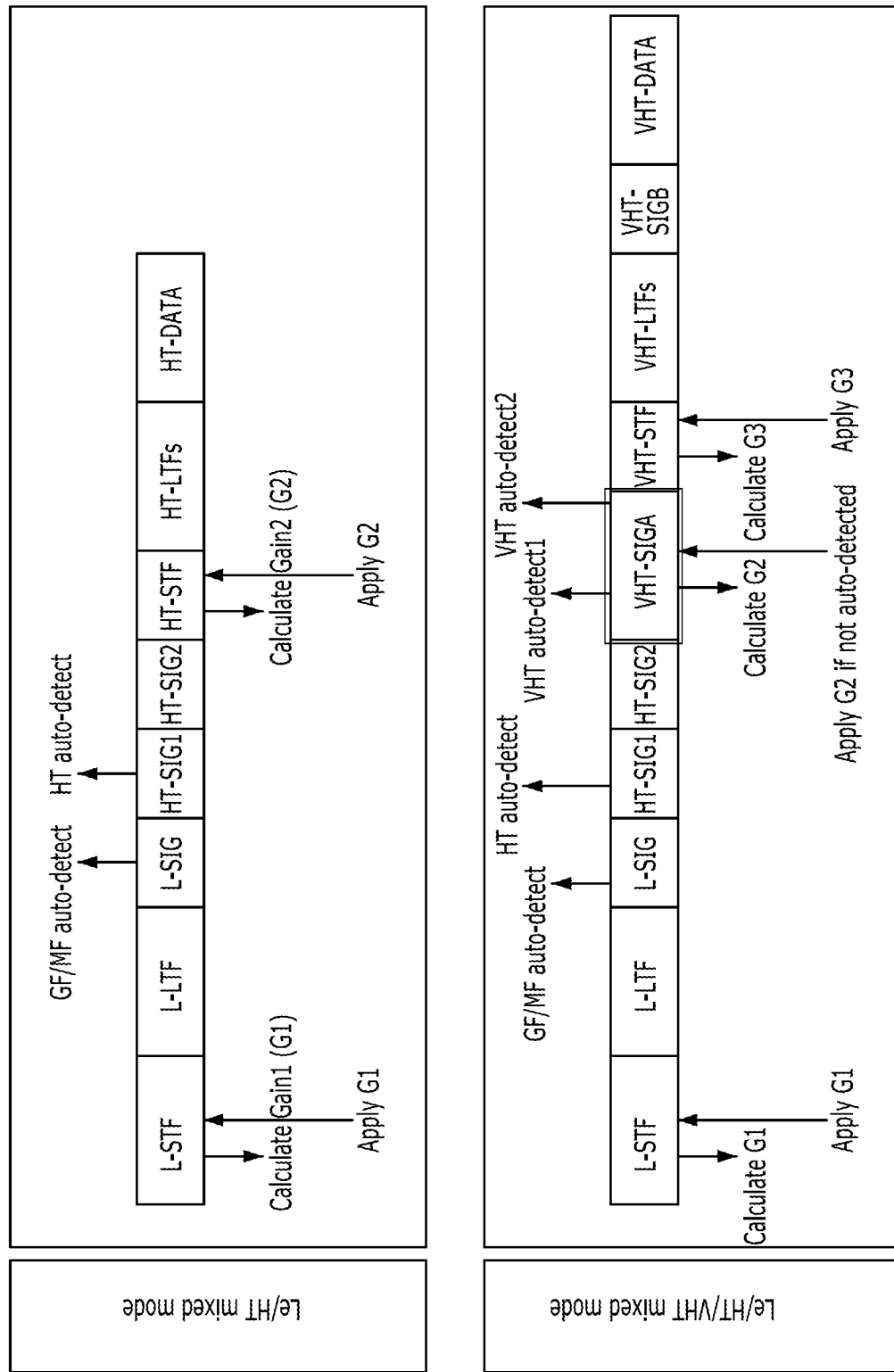
FIG. 21 is a flow diagram illustrating the location of HT-STF in a legacy/HT mixed mode and the location of VHT-SIGA in a legacy/HT/VHT mixed mode for detailed gain control in accordance with an exemplary embodiment of the present invention.

FIG. 21 is a flow diagram illustrating the location of HT-STF in a legacy (Le)/HT mixed mode and the location of VHT-SIGA in a legacy (Le)/HT/VHT mixed mode for detailed gain control in accordance with an exemplary embodiment of the present invention.

As illustrated in FIG. 21, because the location of the VHT-SIGA in a legacy (Le)/HT/VHT mixed mode is the same as the location of the HT-STF in a legacy/HT mixed mode, a VHT terminal must determine whether to perform a detailed gain control. The detailed gain control is performed in the following manner.

After a large gain is controlled in the L-STF, a greenfield (GF)/mixed field (MF) mode is automatically detected in the L-SIG and an HT mode is automatically detected in the HT-SIG1. Then, RX signal level measurement and gain calculation are performed for detailed gain control in the first symbol of the VHT-SIGA. Concurrently, the phase of a data tone and the phase of a pilot tone are calculated, and a packet mode is automatically detected before the end of the first symbol of the VHT-SIGA (more specifically, allowing a stabilization time for gain control). If a phase-inverted pilot is present in the first symbol of the VHT-SIGA as described above or a 90-degree phase-modulated data tone is detected, it is identified as a VHT mode. Herein, a mode recheck is performed at the second symbol of the VHT-SIGA without applying the calculated detailed gain control value. On the other hand, if a phase-inverted pilot is not present in the first symbol of the VHT-SIGA and a 90-degree phase-modulated data tone is not detected, it is identified as an HT mode. Herein, the calculated detailed gain control value is applied to shift to an HT-LTF reception state. In this manner, the present invention can effectively perform the automatic detection and the detailed gain control.

As described above, the present invention determines the packet to be a VHT mode packet, when detecting the data tone phase rotation of a signal following a legacy mode or HT mode signal field or an HT mode preamble symbol. Also, the present invention determines the packet to be a VHT mode packet, when detecting the pilot tone phase rotation of a signal following a legacy mode or HT mode signal field or an HT mode preamble symbol.

Figure 22:
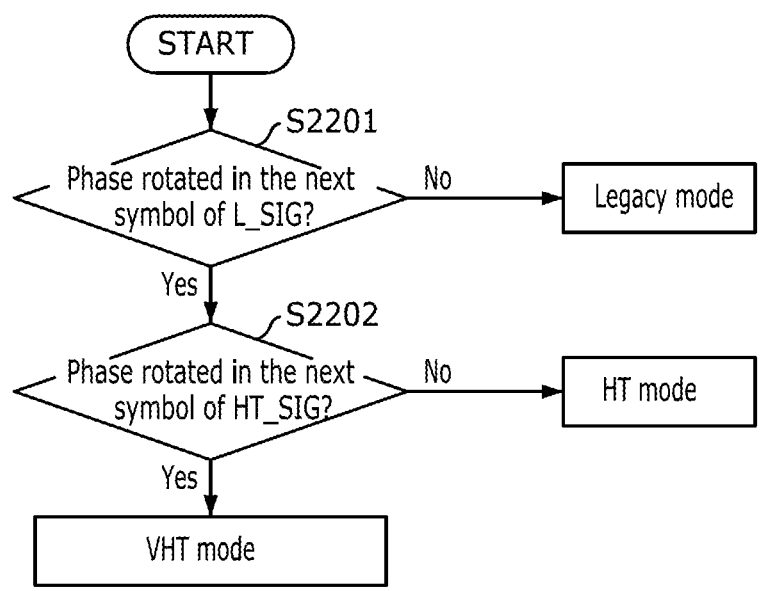
FIG. 22 is a flow diagram illustrating a method for detecting a packet mode by phase rotation of a signal field in accordance with an exemplary embodiment of the present invention.
Figure 23:
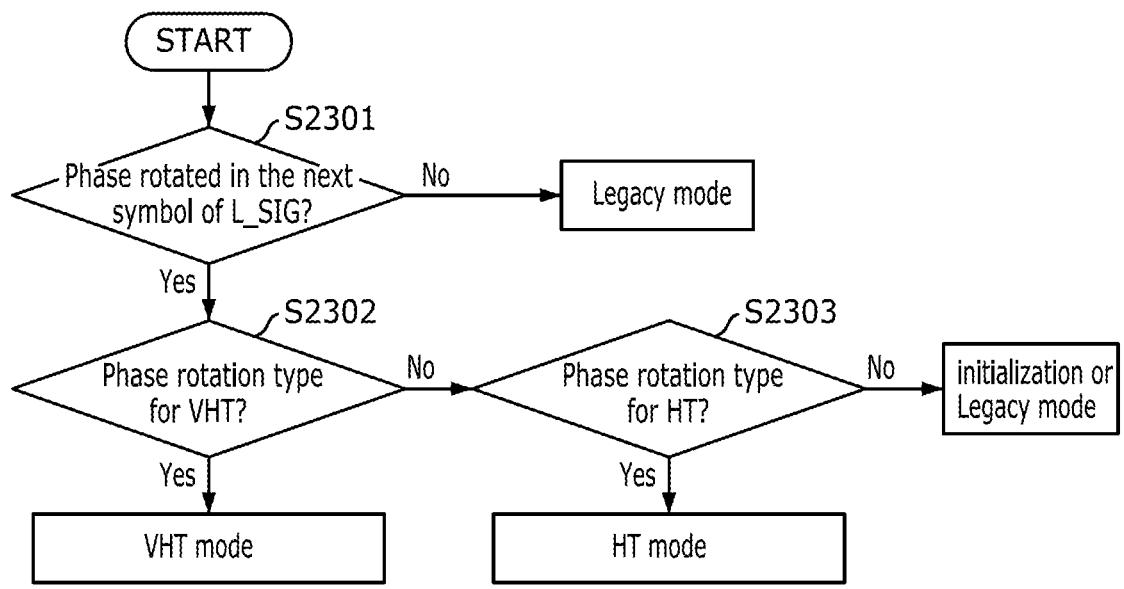
FIG. 23 is a flow diagram illustrating a method for detecting a packet mode by using phase rotation type information in accordance with an exemplary embodiment of the present invention.

FIGS. 22 and 23 are flow diagrams illustrating a method for detecting a packet mode according to the present invention described above.

FIG. 22 illustrates a method for detecting a packet mode by determining the phase shift of a pilot tone and a data tone of the aforesaid signal field in a frame structure where an L-SIG field, an HT-SIG field and a VHT-SIG field are sequentially located.

Referring to FIG. 22, if the phase rotation is not detected in the symbol following the L-SIG field (step S2201), it is determined to be a legacy mode packet. If the phase rotation is detected in the symbol following the L-SIG field and if the phase rotation is not detected in the symbol following the HT-SIG field (step S2202), it is determined to be an HT mode packet. If the phase rotation is detected in the symbol following the L-SIG field (step S201) and if the phase rotation is detected in the symbol following the HT-SIG field (step S2202), it is determined to be a VHT mode packet.

FIG. 23 a method for identifying an HT mode or a VHT mode according to the phase shift type in a frame structure where a VHT-SIG field directly follows an L-SIG field.

Referring to FIG. 23, if the phase shift is not detected in the symbol following the L-SIG field (step S2301), it is determined to be a legacy mode packet. If the phase shift is detected in the symbol following the L-SIG field, the mode is determined according to the phase rotation type of a VHT mode or an HT mode determined according to the degree of the data phase shift and the pilot phase shift (steps S2302 and S2303).

Meanwhile, in the case of a frame structure where a sequence with a specific pattern is inserted after a legacy field (L-SIG or HT-SIG), the present invention may detect a packet mode in the following manner.

The preamble following the L-SIG field is a short preamble, which is inserted for a fine automatic gain control of an RX packet operating in a multi-antenna mode. However, according to the correlation calculation result using the repetitiveness of a preamble, it can be determined whether a VHT part or a data field is allocated after an L-SIG field. Also, if an HT-SIG field follows an L-SIG field and a preamble follows an HT-SIG field, it must be determined whether it is an HT mode or a VHT mode. To this end, the determination may be made by using the VHT-STF having a different phase from the HT-STF. That is, by using the 90-degree, 180-degree or 270-degree phase-shifted VHT-STF of the HT-STF or by varying the periodicity thereof, it can be detected whether the packet is a VHT mode packet or an HT mode packet. This method may be included in the phase difference-based packet mode detection method of FIG. 23, but differs from the packet mode detection method of FIG. 23 in that it detects a packet mode by using a preamble instead of a signal field.

Meanwhile, the present invention includes a method of detecting a packet mode by using a reserved bit of the L-SIG and the HT-SIG. Each of the L-SIG and the HT-SIG includes a 1-bit reserved bit, and the present invention includes a method of setting a reserved bit to '1' for transmission in order to accurately inform whether the packet is an HT mode packet or a VHT mode packet.

A detailed embodiment thereof will be described in the context of the case where a frame is constructed in the order of L-SIG, HT-SIG and VHT-SIG.

In the first method, if the reserved bit of the L-SIG is '1', the packet is determined to be an HT mode packet; and if the reserved bit of the L-SIG is '0', the packet is determined to be a legacy mode packet. Also, if the reserved bit of the HT-SIG is '1', the packet is determined to be a VHT mode packet; and if the reserved bit of the HT-SIG is '0', the packet is determined to be an HT mode packet.

In the second method, if the reserved bit of the L-SIG is '1', the packet is determined to be a VHT mode packet; and if the reserved bit of the L-SIG is '0', the packet is determined to be an HT mode packet. Also, if the reserved bit of the HT-SIG is '1', the packet is determined to be a VHT mode packet; and if the reserved bit of the HT-SIG is '0', the packet is determined to be an HT mode packet.

A description will be given of a frame structure where a VAHT-SIG field follows an L-SIG field without an HT-SIG field interposed therebetween.

If the reserved bit of the L-SIG is '1', the packet is determined to be a VHT mode packet; and if the reserved bit of the L-SIG is '0', the packet is determined to be a legacy mode packet.

As described above, the method of using the reserved bit of the L-SIG or the HT-SIG can further improve the packet mode detection accuracy when used simultaneously with the aforesaid various packet mode detection methods.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

Because the conventional packet mode detection method must detect a packet mode by a limited number of data tones before decoding an HT signal field HT-SIG, the reliability and stability of the packet mode detection depends greatly on the hardware processing speed of a receiving terminal. Also, in the case of the conventional method for discriminating between a legacy mode data field signal and an HT signal field (HT-SIG) signal, packet mode detection becomes difficult as the modulation scheme approaches 64-QAM. Also, the accuracy decreases as the noise becomes serious.

The present invention can detect a packet mode according to the channel type, the packet length and the data rate of the signal field while maintaining the compatibility with the conventional technology.

When transmitting a VHT mode packet, the present invention sets the data rate of a legacy signal field and an HT signal field to the lowest data rate mode. Also, the present invention uses the packet length information to enable a conventional HT terminal to protect a VHT packet and uses this to make it possible to detect a VHT mode packet. Also, unlike the conventional method, the present invention uses a 40 MHz or more channels to transmit a VHT packet and provides a multi-channel transmission through nonadjacent channels, thus making it possible to determine whether the packet is a legacy mode packet or a VHT mode packet, by using the channel information detected through carrier sensing.

Also, in order to detect a packet mode with a high reliability while maintaining the compatibility with the conventional technology, the present invention rotates the data tone and the pilot tone when transmitting the VHT signal field VHT-SIG following the HT signal field. Also, the present invention can provide a packet mode detection not only by using a signal field but also by using a preamble.

For automatic packet mode detection, the signal field modulation method according to the present invention includes all the possible combinations as the modulation scheme using the phase rotation of a pilot tone and a data tone in order to solve the reliability problem of the conventional method. That is, the present invention modulates a signal field VHT-SIG for a VHT terminal prior to transmission by using one of the combinations of the case of rotating the phase of a data tone by 45 degrees (or 135 degrees), by 90 degrees, or by 180 degrees (or 0 degree) and the case of rotating the phase of a pilot tone by 0 degree, by 90 degrees, by 180 degrees, or by 270 degrees, thereby making it possible to detect a packet mode with a high reliability.

While the present invention has been described with respect to the specific embodiments, it will be apparent to those skilled in the art that various changes and modifications may be made without departing from the spirit and scope of the invention as defined in the following claims.

We claim:

1. A wireless communication method comprising:
   receiving frame including a first signal field, a second signal field and a third signal field, wherein the first signal field comprises a first orthogonal frequency division multiplexing (OFDM) symbol, the second signal field comprises a second OFDM symbol and a third OFDM symbol the third signal field comprises a fourth OFDM symbol;
   decoding the first OFDM symbol based on Binary Phase Shift Keying (BPSK);
   decoding the third OFDM symbol based on Quadrature Binary Phase Shift Keying (Q-BPSK); and
   decoding the fourth OFDM symbol based on BPSK,
   wherein the first signal field immediately precedes the second signal field and the second signal field precedes the third signal field.

2. The wireless communication method of claim 1, wherein each of the first, second, third and fourth OFDM symbols comprises a pilot sequence, each of the pilot sequences being BPSK modulated.

3. The wireless communication method of claim 1, wherein the first signal field is a legacy signal (L-SIG) field, the second signal field is a Very High Throughput signal A (VHT-SIG-A) field, and the third signal field is a Very High Throughput signal B (VHT-SIG-B) field.

4. A wireless communication apparatus, comprising:
   circuitry configured to:
      cause the apparatus to receive a frame including a first signal field, a second signal field and a third signal field, wherein the first signal field comprises a first orthogonal frequency division multiplexing (OFDM) symbol, the second signal field comprises a second OFDM symbol and a third OFDM symbol and the third signal field comprises a fourth OFDM symbol;
      decode the first OFDM symbol based on Binary Phase Shift Keying (BPSK);
      decode the fourth OFDM symbol on Quadrature Binary Shift Keying (Q-BPSK); and
      decode the fourth OFDM symbol based on BPSK,
   wherein the first signal field immediately precedes the second signal field and the second signal field precedes the third signal field.

5. The wireless communication apparatus of claim 4, wherein each of the first, second, third and fourth OFDM symbols comprises a pilot sequence, each of the pilot sequences being BPSK modulated.

6. The wireless communication apparatus of claim 4, wherein the first signal field is a legacy signal (L-SIG) field, the second signal field is a Very High Throughput signal A (VHT-SIG-A) field, and the third signal field is a Very High Throughput signal B (VHT-SIG-B) field.

7. A device for a station, the device comprising:
   circuitry configured to:
      cause the station to receive a frame including a first signal field, a second signal field and a third signal field, wherein the first signal field comprises a first orthogonal frequency division multiplexing (OFDM) symbol, the second signal field comprises a second OFDM symbol and a third OFDM symbol and the third signal field comprises a fourth OFDM symbol;
      decode the first OFDM symbol based on Binary Phase Shift Keying (BPSK);
      decode the third OFDM symbol based on BPSK,
   wherein the first signal field immediately precedes the second signal field and the second signal field precedes the third signal field.

8. The device of claim 7, wherein each of the first, second, third and fourth OFDM symbols comprises a pilot sequence, each of the pilot sequences being BPSK modulated.

9. The device of claim 8, wherein the first signal field is a legacy signal (L-SIG) field, the second signal field is a Very High Throughput signal A (VHT-SIG-A) field, and the third signal field is a Very High Throughput signal B (VHT-SIG-B) field.

10. A wireless communication method, comprising:
    generating a first signal field comprising a first orthogonal frequency division multiplexing (OFDM) symbol;
    generating a second signal field comprising a second OFDM symbol and a third OFDM symbol;
    generating a third signal field comprising a fourth OFDM symbol;
    generating a frame comprising the first signal field, the second signal field and the third signal field, wherein the first signal field immediately precedes the second signal field and the second signal field precedes the third signal field; and transmitting the first frame, wherein the first and fourth OFDM symbols are generated based on Binary Phase Shift Keying (BPSK) and the third OFDM symbol is generated based on Quadrature Binary Phase Shift Keying (Q-BPSK).

11. The wireless communication method of claim 10, wherein each of the first, second, third and fourth OFDM symbols comprises a pilot sequence, each of the pilot sequences being BPSK modulated.

12. The wireless communication method of claim 10, wherein the first signal field is a legacy signal (L-SIG) field, the second signal field is a Very High Throughput signal A (VHT-SIG-A) field, and the third signal field is a Very High Throughput signal B (VHT-SIG-B) field.

13. A device for a station, the device comprising:
circuitry configured to:
generate a first signal field comprising a first orthogonal frequency division multiplexing (OFDM) symbol;
generate a second signal field comprising a second OFDM symbol and a third OFDM symbol;
generate a third signal field comprising a fourth OFDM symbol;
generate a frame comprising the first signal field, the second signal field and the third signal field, wherein the first signal field immediately precedes the second signal field and the second signal field precedes the third signal field; and
cause the station to transmit the first frame,
wherein the first and fourth OFDM symbols are generated based on Binary Phase Shift Keying (BPSK) and the third OFDM symbol is generated based on Quadrature Binary Phase Shift Keying (Q-BPSK).

14. The communication device of claim 13, wherein each of the first, second, third and fourth OFDM symbols comprises a pilot sequence, each of the pilot sequences being BPSK modulated.

15. The device of claim 13, wherein the first signal field is a legacy signal (L-SIG) field, the second signal field is a Very High Throughput signal A (VHT-SIG-A) field, and the third signal field is a Very High Throughput signal B (VHT-SIG-B) field.

16. A wireless communication apparatus, comprising:
circuitry configured to:
generate a first signal field comprising a first orthogonal frequency division multiplexing (OFDM) symbol;
generate a second signal field comprising a second OFDM symbol and a third OFDM symbol;
generate a third signal field comprising a fourth OFDM symbol;
generate a frame comprising the first signal field, the second signal field and the third signal field, wherein the first signal field immediately precedes the second signal field and the second signal field precedes the third signal field; and
cause the apparatus to transmit the frame,
wherein the first and fourth OFDM symbols are generated based on Binary Phase Shift Keying (BPSK) and the third OFDM symbol is generated based on Quadrature Binary Phase Shift Keying (Q-BPSK).

17. The wireless communication apparatus of claim 16, wherein each of the first, second, third and fourth OFDM symbols comprises a pilot sequence, each of the pilot sequences being BPSK modulated.

18. The wireless communication apparatus of claim 16, wherein the first signal field is a legacy signal (L-SIG) field, the second signal field is a Very High Throughput signal A (VHT-SIG-A) field, and the third signal field is a Very High Throughput signal B (VHT-SIG-B) field.

* * * * *